(12) United States Patent
Rebstock et al.

(10) Patent No.: US 10,089,287 B2
(45) Date of Patent: Oct. 2, 2018

(54) REDACTION WITH CLASSIFICATION AND ARCHIVING FOR FORMAT INDEPENDENCE

(75) Inventors: John Rebstock, Edmonton (CA); Christopher K. Schrichte, Missoula, MT (US)

(73) Assignee: Teradact Solutions, Inc., Washington, DC (US)

( * ) Notice: Subject to any disclaimer, the term of this patent is extended or adjusted under 35 U.S.C. 154(b) by 1736 days.

(21) Appl. No.: 13/331,113

(22) Filed: Dec. 20, 2011

(65) Prior Publication Data
US 2012/0159296 A1 Jun. 21, 2012
US 2016/0012027 A9 Jan. 14, 2016

Related U.S. Application Data

(63) Continuation-in-part of application No. 12/152,763, filed on May 16, 2008, which is a continuation-in-part of application No. 11/544,685, filed on Oct. 6, 2006.

(60) Provisional application No. 61/459,912, filed on Dec. 20, 2010, provisional application No. 60/724,986, filed on Oct. 6, 2005.

(51) Int. Cl.
| | |
|---|---|
| G06F 17/24 | (2006.01) |
| G06F 17/27 | (2006.01) |
| G06Q 10/00 | (2012.01) |
| G06F 17/21 | (2006.01) |
| G06F 17/30 | (2006.01) |
| G06K 9/00 | (2006.01) |

(52) U.S. Cl.
CPC ............ *G06F 17/24* (2013.01); *G06F 17/211* (2013.01); *G06F 17/271* (2013.01); *G06F 17/272* (2013.01); *G06F 17/2705* (2013.01); *G06F 17/30011* (2013.01); *G06K 9/00456* (2013.01); *G06Q 10/00* (2013.01)

(58) Field of Classification Search
CPC .. G06F 17/2705; G06F 17/271; G06F 17/272; G06F 17/211; G06F 17/30011; G06F 17/24; G06K 9/00456; G06Q 10/00
USPC ................ 715/205, 243, 246, 255, 271–272; 345/563
See application file for complete search history.

(56) References Cited

U.S. PATENT DOCUMENTS

| | | | |
|---|---|---|---|
| 5,903,646 A | 5/1999 | Rackman | 705/51 |
| 6,889,205 B1 | 5/2005 | Lamm | 705/40 |
| 7,216,125 B2 | 5/2007 | Goodwin | |
| 7,272,610 B2 | 9/2007 | Torres | |
| 7,281,020 B2 | 10/2007 | Fine | 707/104.1 |
| 7,292,723 B2 | 11/2007 | Tedesco et al. | 382/159 |
| 7,428,701 B1 | 9/2008 | Gavin et al. | 715/243 |
| 7,590,693 B1 | 9/2009 | Chan et al. | 709/206 |
| 7,653,876 B2 | 1/2010 | Ethier et al. | 715/249 |
| 7,876,335 B1 * | 1/2011 | Pittenger | G06F 17/24 345/619 |

(Continued)

FOREIGN PATENT DOCUMENTS

NZ      535943      10/2004

*Primary Examiner* — Chau T Nguyen
(74) *Attorney, Agent, or Firm* — Harrington & Smith

(57) ABSTRACT

A method including creating a universal view of a document in an archive, where the universal view comprises individual portions of information from the document as individual elements of the universal view; applying classifications to at least some of the individual elements; and supplying the individual elements with their respectively applied classifications from the archive.

19 Claims, 25 Drawing Sheets

(56) References Cited

U.S. PATENT DOCUMENTS

| | | |
|---|---|---|
| 8,407,805 B2 * | 3/2013 | Warrington et al. ......... 709/206 |
| 2001/0018739 A1 | 8/2001 | Anderson et al. ............ 713/176 |
| 2002/0062342 A1 | 5/2002 | Sidies ........................... 709/203 |
| 2002/0083079 A1 | 6/2002 | Meier et al. ............... 707/104.1 |
| 2002/0158864 A1 | 10/2002 | Matichuk ..................... 345/418 |
| 2003/0014394 A1 | 1/2003 | Fujiwara et al. ................. 707/3 |
| 2003/0051054 A1 | 3/2003 | Redlich et al. ............... 709/246 |
| 2003/0115481 A1 | 6/2003 | Baird et al. ................... 713/201 |
| 2003/0145017 A1 | 7/2003 | Patton et al. ............... 707/104.1 |
| 2003/0172034 A1 | 9/2003 | Schneck et al. ................ 705/54 |
| 2004/0075692 A1 | 4/2004 | Matichuk ..................... 345/806 |
| 2004/0088313 A1 * | 5/2004 | Torres ............... G06F 17/30011 |
| 2004/0139043 A1 | 7/2004 | Lei et al. .......................... 707/1 |
| 2004/0220919 A1 | 11/2004 | Kobayashi ....................... 707/3 |
| 2004/0236651 A1 | 11/2004 | Emde et al. .................... 705/34 |
| 2005/0027495 A1 | 2/2005 | Matichuk ......................... 703/2 |
| 2005/0108351 A1 | 5/2005 | Naick et al. .................. 709/207 |
| 2005/0246338 A1 | 11/2005 | Bird .................................. 707/9 |
| 2005/0289447 A1 | 12/2005 | Hadley et al. .............. 715/501.1 |
| 2006/0064633 A1 | 3/2006 | Adams .......................... 715/505 |
| 2006/0075228 A1 | 4/2006 | Black et al. .................. 713/167 |
| 2006/0143459 A1 | 6/2006 | Villaron et al. ............... 713/176 |
| 2006/0155863 A1 | 7/2006 | Schmidt ........................ 709/229 |
| 2006/0218149 A1 | 9/2006 | Patrick .............................. 707/9 |
| 2006/0242558 A1 | 10/2006 | Racovolis et al. ............ 715/511 |
| 2006/0259983 A1 | 11/2006 | Sperry ............................ 726/28 |
| 2006/0288285 A1 | 12/2006 | Lai et al. ....................... 715/708 |
| 2007/0030528 A1 | 2/2007 | Quaeler et al. ............... 358/453 |
| 2007/0094594 A1 | 4/2007 | Matichuk et al. ............ 715/530 |
| 2007/0174766 A1 | 7/2007 | Rubin et al. .................. 715/530 |
| 2007/0219966 A1 | 9/2007 | Baylis et al. ..................... 707/3 |
| 2008/0028300 A1 | 1/2008 | Krieger et al. ................ 715/255 |
| 2008/0049271 A1 | 2/2008 | Carlson et al. ............... 358/498 |
| 2008/0204788 A1 | 8/2008 | Kelly et al. .................. 358/1.15 |
| 2009/0089663 A1 * | 4/2009 | Rebstock et al. ............. 715/253 |
| 2009/0296166 A1 | 12/2009 | Schrichte ...................... 358/474 |
| 2010/0010968 A1 * | 1/2010 | Redlich ............. G06F 17/30672<br>707/E17.014 |
| 2010/0070396 A1 * | 3/2010 | Schrichte ............... G06Q 10/00<br>705/34 |
| 2010/0229246 A1 * | 9/2010 | Warrington ......... G06F 21/6218<br>726/28 |
| 2010/0263060 A1 * | 10/2010 | Charbonneau ...... G06F 21/6218<br>726/30 |

\* cited by examiner

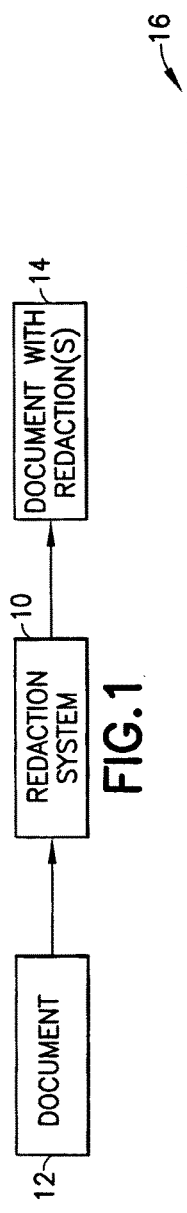

ARREST REPORT

| NAME OF SUSPECT | ADDRESS | OCCUPATION |
|---|---|---|
| JOHN DOE | 1278 ELM STREET SPRINGFIELD, VA | COURIER |

| AGE OF SUSPECT |
|---|
| 32 |

(SECTION REDACTED)

| TYPE OF ARREST | FELONY (X) MISDEMEANOR ( ) | CONTRABAND SUBSTANCES |
|---|---|---|
| DRUG TRAFFICKING | | COCAINE |

(SECTION REDACTED)

NARRATIVE OF ARREST

NARRATIVE OF ARREST:

ON JUNE 20, 2005, JOHN DOE WAS OBSERVED BY SA HENRY THOMPSON AND SA GARY WILLIAMS PURCHASING A TICKET AT THE DELTA AIRLINES TICKET COUNTER. JOHN DOE PROCEEDED TO THE AMERICAN CAFE AT 123 ELM STREET TO MEET WITH FPD INFORMANT "BERT". A WHITE LETTER SIZED ENVELOPE WAS GIVEN TO JOHN DOE BY "BERT". JOHN DOE THEN GAVE "BERT" A SMALL PACKAGE WRAPPED IN BROWN PAPER. SA THOMPSON AND SA WILLIAMS FOLLOWED JOHN DOE FOR APPROXIMATELY ONE BLOCK BEFORE APPREHENDING HIM. JOHN DOE WAS PLACED UNDER ARREST AND THE SMALL PACKAGE EXAMINED AND FOUND TO BE COCAINE

FIG.8

NARRATIVE OF ARREST:

ON JUNE 20, 2005 JOHN DOE WAS OBSERVED BY SA (REDACTED) AND SA (REDACTED) PURCHASING A TICKET AT THE (REDACTED) AIRLINES TICKET COUNTER, JOHN DOE PROCEEDED TO THE AMERICAN CAFE AT 123 ELM STREET TO MEET WITH FPD INFORMANT (REDACTED) A WHITE LETTER SIZED ENVELOPE WAS GIVEN TO JOHN DOE BY (REDACTED).JOHN DOE THEN GAVE (REDACTED) A SMALL PACKAGE WRAPPED IN BROWN PAPER. SA (REDACTED) AND SA (REDACTED) FOLLOWED JOE DOE APPROXIMATELY ONE BLOCK BEFORE APPREHENDING HIM. JOHN DOEWAS PLACED UNDER ARREST AND THE SMALL PACKAGE EXAMINED AND FOUND TO BE COCAINE

FIG.9

SAMPLE RULE SET

```
<text>
<search type="regex">
<arg name="pattern">\d{3}\-\d{2}\-\d{4}</arg>
</serch>
<label domain="CLEARED">TOP_SECRET</label>
</text>
<object>
<search type="xpath">
<arg name="xpath">//img</arg>
</search>
<box unit="percent" x0="73.46939" y0="47.692307" x1="88.86827" y1="69.53846">
<label domain ="PII">SSN</label>
</box>
</object>
```

FIG.24

SAMPLE UNIVERSAL VIEW

```
<p bl="100">
<t bl="101" i="121">987-65-4320</t>
</p>
<p bl="200">
<frame bl="201">
<img bl="202" i="132" path="word/media/image1.png"/>
</frame>
</p>
```

FIG.25

SAMPLE CLASSIFICATION MARKS

```
<box bl="202" x0="73.46939" y0="47.692307" x1="88.86827" y1="69.53846">
<lable domain="CLEARED">TOP_SECRET</label>
</box>                                              26A
<text from="121" to="131">
<label domain="PII">SSN</label>
</text>                      26B
```

FIG.26

SAMPLE LABEL SCHEMES

```
<domain name="CLEARED">
<label name="TOP_SECRET">
<label name="SECRET" />
</label>
</domain>
<domain name="PII">
<label name="SSN"/>
</domain>
```

FIG.27

SAMPLE RELEASABLE CLASSIFICATIONS & RELEASE MARKS

<lable domain="CLEARED" name="SECRET" />
<text bl="101" from="0" to="10" replace="[REDACTED]" />
<box imgPath="word/media/image1.png" x0="73.46939" y0="47.692307" x1="88.86827" y1="69.53846" />

FIG.28

SAMPLE RELEASABLE CLASSIFICATIONS & RELEASE MARKS

<lable domain="CLEARED" name="TOP_SECRET" />
<text bl="101" from="0" to="10" replace="[REDACTED]" />

FIG.29

SAMPLE RELEASABLE CLASSIFICATIONS & RELEASE MARKS

<lable domain="CLEARED" name="SECRET" />
<lable domain="PII" name="SSN" />
<box imgPath="word/media/image1.png" x0="73.46939" y0="47.692307" x1="88.86827" y1="69.53846" />

FIG.30

REDACTION WITH CLASSIFICATION AND ARCHIVING FOR FORMAT INDEPENDENCE

CROSS REFERENCE TO RELATED APPLICATION

This application claims priority under 35 USC 119(e) on U.S. Provisional Patent Application No. 61/459,912 filed Dec. 20, 2010 which is hereby incorporated by reference in its entirety, and is a continuation-in-part of copending application Ser. No. 12/152,763 filed May 16, 2008, which is a continuation-in-part of application Ser. No. 11/544,685 filed Oct. 6, 2006, which claims priority on U.S. provisional patent application No. 60/724,986 filed Oct. 6, 2005.

BACKGROUND OF THE INVENTION

Field of the Invention

The invention relates to documents and, more particularly, to storing and retrieving documents with an electronic archive.

Brief Description of Prior Developments

U.S. Pat. No. 6,889,205, which is hereby incorporated by reference in its entirety, discloses a system and method for preparing a redacted statement, message or file from an electronic statement, message or file and sending it to a party. U.S. Patent Publication Nos. 2002/0158864, 2004/0075692, and 2005/0027495, which are hereby incorporated by reference in their entireties, describe automatic creation of graphical representations, and intelligent agents for integrating information access over extended networks.

Businesses as well as Federal, State and Local government agencies must share information. Examples include case files, arrest reports, subpoenaed documents (e.g., Freedom of Information Act—FOIA, Law Enforcement Information Sharing Program—LEISP, etc.) Redacting classified, confidential or secret information from documents can be labor intensive. No effective means of automating the process of removing sensitive information from documents exists. There is a need for a system and method for automatically removing sensitive information from documents; especially a system which can work with different document types.

SUMMARY

The following summary is merely intended to be exemplary. The summary is not intended to limit the scope of the claims.

In accordance with one aspect, a method includes creating a universal view of a document in an archive, where the universal view comprises individual portions of information from the document as individual elements of the universal view; applying classifications to at least some of the individual elements; and supplying the individual elements with their respectively applied classifications from the archive.

In accordance with another aspect, a method comprises comparing by a filter at least one releasable classification to a classification of at least one individual universal view element, where each of the universal view elements comprises an individual portion of an original document; and creating a redacted document by applying an exclusion to at least one first element of the universal view elements based upon the classification of the at least one first element not matching the at least one releasable classification.

In accordance with another aspect, a method comprise comparing at least one releasable classification to a classification of at least one individual universal view element, where each of the universal view elements comprises an individual portion of an original document; and creating a new document with at least one first element of the universal view elements, where the classification of the at least one first element matches the at least one releasable classification, where the classification of at least one second element of the universal view elements does not match the at least one releasable classification, and where the at least one second element is excluded from creating the new document.

In accordance with another aspect, a method comprises creating a universal view of a document in an archive, where the universal view comprises portions of information from the document as individual elements of the universal view; and applying classifications to at least some of the individual elements, where a first one of the portions is in at least two of the elements, and where each of the at least two elements has a different one of the classifications.

BRIEF DESCRIPTION OF THE DRAWINGS

The foregoing aspects and other features are explained in the following description, taken in connection with the accompanying drawings, wherein:

FIG. 1 is a block diagram depicting a redaction system;

FIG. 2 depicts a document to be redacted;

FIG. 8 depicts a field in the document shown in FIG. 1 that is to be redacted;

FIG. 9 depicts the document field of FIG. 8 in a redacted form;

FIG. 24 is a sample of a ruleset shown in FIG. 23;

FIG. 25 is a sample of a universal view shown in FIG. 23;

FIG. 26 is a sample of classification marks shown in FIG. 23;

FIG. 27 is a sample of label schemes shown in FIG. 27;

FIG. 28 is a sample of releasable classifications and release/exclusion marks shown in FIG. 23;

FIG. 29 is a sample of releasable classifications and release/exclusion marks shown in FIG. 23;

FIG. 30 is a sample of releasable classifications and release/exclusion marks shown in FIG. 23;

DETAILED DESCRIPTION OF EMBODIMENTS

Figures 3, 4:
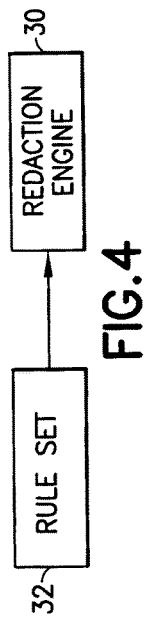
FIG. 3 depicts the document of FIG. 2 in a redacted form.
FIG. 4 is a block diagram depicting components of the redaction system comprising an embodiment of the invention depicted in FIG. 1.

To highlight some of the unique features of a system comprising features, its two primary components can be a "Universal Viewer" and an engine such as a redaction/extraction engine or other classification use engine. The Universal Viewer lets the user view documents of all formats in their entirety, including document meta-data, and allows the user to manually or automatically identify and tag information. Much like a virus scanner, the Universal Viewer can act as a safety net to ensure that sensitive information is identified before a document is allowed to change hands. Once information has been classified with the Universal Viewer, it can be passed along to the engine to be acted upon depending upon rules established by the user. Versatility of a system comprising features described herein allows the user to produce final documents cleansed of sensitive information in all formats, not just PDF.

In a first demonstration, the Universal Viewer can be used to redact both data and metadata. One example is a Microsoft Word document that contains both text and images. The document's text and images are displayed in the Universal Viewer's 'Content' tab, where the viewer's tools can be used to redact portions of text and to remove images from the document. The 'Metadata' tab displays the document's hidden data, like the creator and modifier of the document. This metadata can also be removed using the viewer's tools. The format of the redacted document can be the same as the original, and can be opened and viewed using its native editor. For a redacted document where the selected text and image have been removed, one can dig deeper into the document's metadata, to see that the document's creator and modifier tags have also been removed. Powerpoint is another format supported by the Universal Viewer. All document content can be displayed in the viewer, not only slide content, but also specialized content such as notes and comments.

In a second demonstration, automatic redaction can be performed by applying a set of redaction rules to the document. The ruleset can be composed from pre-defined rules, and/or from ad hoc rules. Rules can be either regular expressions or simple text matches for example. In this example, this rule set can be used to match phone numbers and email addresses, as well as the name 'Hodson'. The document can be imported into the Universal Viewer the same way as for manual redaction. After the document has been imported, the ruleset can be applied to the document. Thus, the phone numbers and emails have been marked for redaction, along with the name 'Hodson'. In the redacted document, all of the marked content has been removed. Manual redactions may be added to the document in addition to the redactions matched by the rule set.

In a third demonstration, classification labels allow the reviewer to mark document content for multiple audiences. An example is a simple hierarchical label scheme. A system comprising features of the invention can also support pre-existing label schemes of arbitrary complexity, under the control of external systems through a plug-in to the redaction engine for example. When content is marked for redaction using a label scheme, the reviewer chooses the label to be applied to each redaction. In this case the reviewer can choose to mark agent's names as 'Top Secret', and the reviewer can mark other content as 'Secret'. The reviewer can then choose to release the document for a specific audience. The release criteria can also be supplied to the redaction engine externally through a plug-in. In a first case, the reviewer chooses to releases for a 'Public' audience, and all marked content will be redacted. In a second case, the reviewer chooses to release for a 'Secret' audience, and all content marked 'Secret' will be released, but all content marked 'Top Secret' will be redacted.

In a fourth demonstration, the Universal Viewer provides tools for partial redaction of images. These tools can be used with PDF files, images embedded in documents, and raw images, such as TIFF files. Embedded document images can be redacted without conversion to TIFF or PDF. The released document can retain the same format as the original. Multi-page TIFF documents are manually redacted using the image redaction tools. One or several pages of the document may be marked for redaction. The Universal Viewer provides tools for creating image rule sets based on manual redactions. Here the reviewer can apply manual redactions to a PDF form. The reviewer can then create a rule set which can then be applied to other documents. This is useful for collections of documents that have the same formatting.

In a fifth demonstration, documents can also be redacted automatically using redaction rules and rule sets. The Universal Viewer can provide end-to-end options that allow the user to create redacted documents directly without going through a manual review. Documents may also be submitted for automatic redaction through an add-in in Microsoft Word for example. Single documents or groups of documents may be submitted for redaction through Microsoft Explorer for example.

Referring to FIG. 1, there is shown a block diagram of a redaction system 10. Although the invention will be described with reference to the exemplary embodiments shown in the drawings, it should be understood that the invention can be embodied in many alternate embodiments. A similar redaction system is described in U.S. Patent Publication No. 2007/0094594 A1 which is hereby incorporated by reference in its entirety.

The redaction system 10 is adapted to process a document 12 or electronic version of the document or information in the document to create a modified document 14 or electronic version of the modified document with one or more redactions. Modified document 14 is also referred to below as 130 or 132. An example is shown with reference to FIGS. 2 and 3. FIG. 2 shows a portion of the document 12 in the form of an arrest report 16. The arrest report 16 comprises portions 18-29. The portions of a document, as is shown in FIG. 2, can be established with the software of the invention. As seen with reference to FIG. 3, one or more of the portions can be redacted in a computer generated modified document 14 of the arrest report 16.

Referring also to FIG. 4, the redaction system 10 generally comprises a redaction engine 30 and a rule set 32. The redaction engine 30 generally comprises a computer system. A computer system operating in accordance with the invention can take many forms such as a desktop computer; a notebook computer; or a computing system distributed across a network. In each instance, the computing system comprises a source of documents to be redacted; a memory for storing a program configured to perform operations in accordance with the methods of the invention when executed; and digital processing apparatus coupled to the source of electronic documents to be redacted and the memory. The redaction engine 30 is adapted to take an electronic version of the document 12, and remove or redact information in the document using rules accessed from the rule set 32 to produce the modified document 14. The rule set 32 comprises a set of rules and/or process models to be applied by the redaction engine 30.

Figure 5:
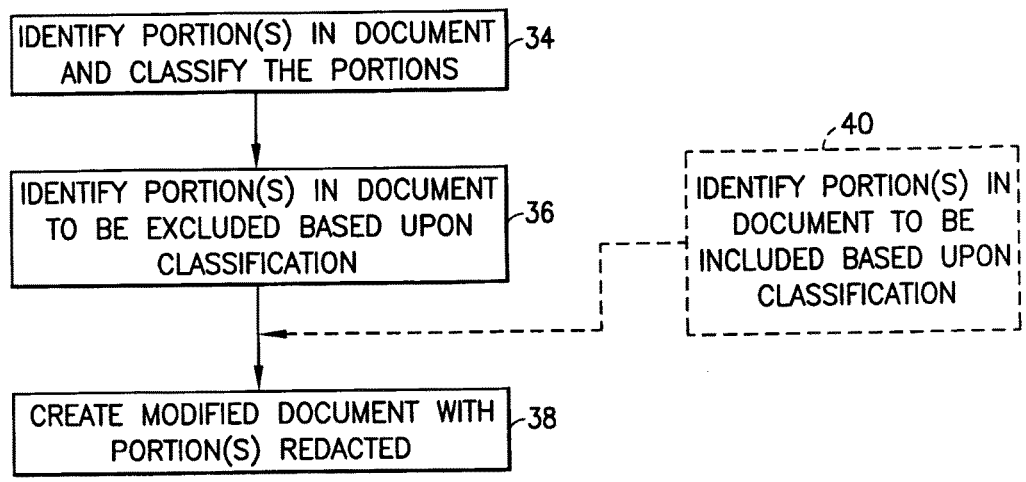
FIG. 5 is a flowchart depicting an example method.

Referring also to FIG. 5, the redaction engine 30 comprises software which is adapted to identify and classify portions(s) in a document as indicated by block 34; such as at least portions 22-25 in the example of FIGS. 2-3. The redaction engine 30 is then able to identify portion(s) in the document to be excluded based upon the classifications in the rule set 32 as indicated by block 36. As indicated by block 38, the redaction engine can create a modified document with one or more portions redacted based upon classification. For the example shown in FIGS. 2 and 3, the redaction engine can identify classification of the portions 18-29 in the original document 12, identify the portions 22, 23, 24 and 25 to be excluded based upon their individual classifications and the rules in the rule set 32, and create the modified document 14 with the information in the portions 22-25 redacted. In this embodiment the redacted information is replaced by the phrase "SECTION REDACTED". However, any suitable type of redaction indicia, such as marking could be provided. In other embodiments, no redaction indicia are provided in the redacted versions of the documents. This masks from users what categories of information have been redacted.

In addition to identifying portion(s) to be excluded, or as an alternative to identifying portion(s) to be excluded when all are to be excluded unless indicated to be included, as indicated by block 40 the redaction engine 30 could be adapted to identify portion(s) in the document to be included based upon the classifications by rule set 36. In a preferred embodiment 40 is not provided. In the event that 40 is provided, in such an example embodiment there still could be no conflicts between 36 and 40 because 36 would always occur.

Figure 6:
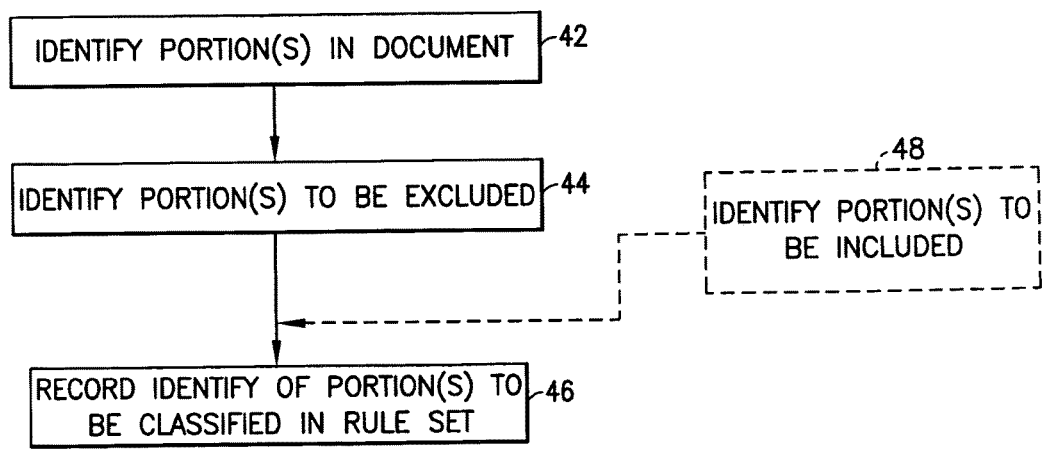
FIG. 6 is a flowchart depicting an example method.

The rule set 32 is setup or established before the redaction engine 30 can run automatically. Referring also to FIG. 6, establishment of the rule set 32, or at least a portion of the rule set, can comprise identifying portions in a document as indicated by block 42, and identifying portion(s) to be classified for exclusion as indicated by block 44, such as the monitoring portion 22, the Name of Officer portion 23, the Badge number portion 24 and the Home Office of Arresting Officer portion 25 shown in FIGS. 2 and 3. The portion(s) in a sample document could be used to identifying portion(s) as indicated by block 42, such as the portions 18-29 shown in FIGS. 2 and 3. For example, use of software such as described in U.S. Patent Publication Nos. 2002/0158864, 2004/0075692, and 2005/0027495 could be used. The identity of the portion(s) to be classified in the rule set is then recorded for that type of document as indicated by block 46 for use in the future on similar types of documents (e.g., other arrest reports). As indicated by block 48, portion(s) could also be identified and classified to be included for use with block 40 shown in FIG. 5. In a preferred embodiment 48 is not provided. However, in an example embodiment were 48 was provided conflicts between 44 and 48 could be prevented from occurring because 44 could always occur.

Figure 7:
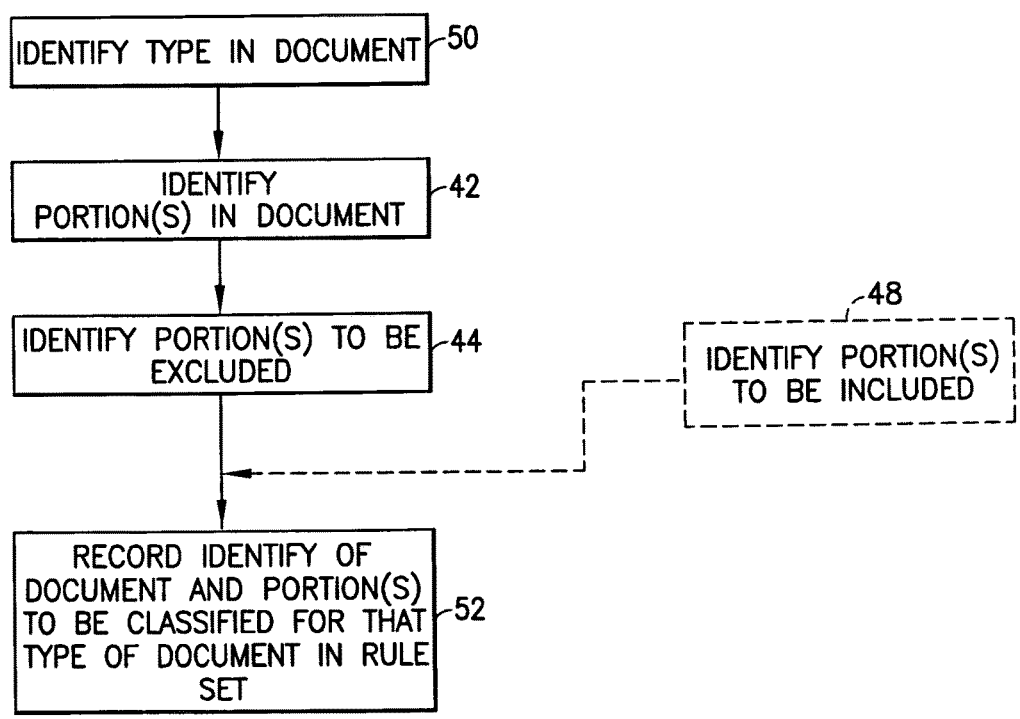
FIG. 7 is a flowchart depicting an example method.

Referring also to FIG. 7, features can be used with different types of documents. For example, a police drug seizure report could be different than an arrest report. When features are used with different type documents, the redaction system may be adapted to identify a type of document as indicated by block 50. This could be a manual indication of the type of document by a person inputting the document into a database, a code on the document, or automatic recognition of the document type by the redaction system for example.

After the type of document is identified, or perhaps during identification, the rule set-up process can comprise identifying portion(s) to be excluded as indicated by blocks 44. 48 is optional. The identity of the portion(s) to be classified for exclusion/inclusion in the rule set is then recorded for that type of document as indicated by block 52 for use in the future on similar types of documents (e.g., other arrest reports). Portion(s) could also be identified to be classified for inclusion in the rule set with block 40 shown in FIG. 5.

Referring also to FIG. 8, another portion of the arrest report document 12 is shown, specifically the Narrative of Arrest portion 29. Referring also to FIG. 9, which shows the portion 29 after automatic redaction by the redaction system 10, the invention can be used to redact sub-portions or text in a portion. The text could comprise words, phrases or characters or specific combinations for example. In the example shown, the names of the special agents, witness location, and name of confidential informant are automatically redacted. Other forms of information could also be redacted, such as, for example, graphical information (organization logos), visual information, photographic images, etc. These are merely examples.

Figure 10:
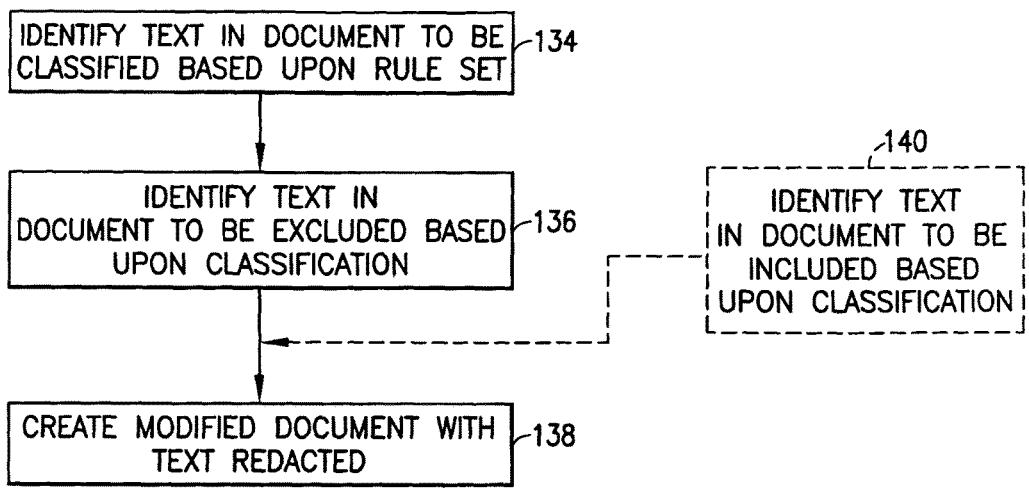
FIG. 10 is a flowchart depicting an example method.

Referring also to FIG. 10, the redaction engine 30 comprises software which is adapted to identify text or words or phrases or characters in a document and classify them as indicated by block 134. The redaction engine 30 is then able to identify text or words or phrases or characters or areas in the document to be excluded based upon the classification 134 as indicated by block 136. As indicated by block 138, the redaction engine can create a modified document with one or more of the identified areas redacted. For the example shown in FIGS. 8 and 9, the redaction engine can exclude the names of the special agents, witness location, and name of confidential informant in portion 29 of the original document 12, exclude the names Henry Thompson, Gary Williams, Delta Airlines, and informant Bert, and create the modified document 14 with the information in the automatically identified text redacted. In this embodiment the redacted information is replaced by the phrase "REDACTED". However, any suitable type of redaction marking or deletion could be provided. In addition to identifying portion(s) to be excluded, or as an alternative to excluding portion(s) when all are to be excluded unless indicated to be included, as indicated by block 140 the redaction engine 30 could optionally be adapted to include portion(s). In this example, the text to be redacted in portion 29 could be imported into the rule set from a database(s) containing names of police officers, confidential informants and witnesses for example.

Figure 11:
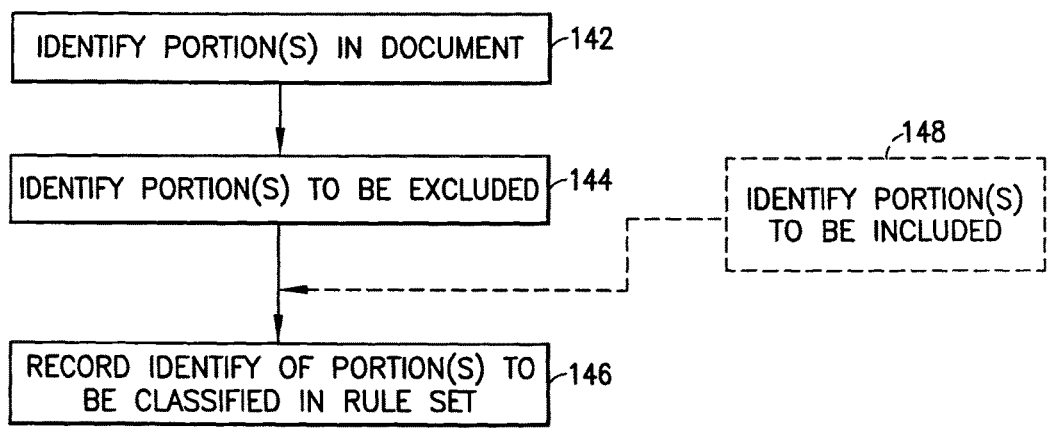
FIG. 11 is a flowchart depicting an example method.

Referring also to FIG. 11, establishment of the rule set 32, or at least a portion of the rule set, can comprise identifying text portions as indicated by 142, and identifying text to be classified for exclusion as indicated by block 144, such as the names of officers as shown in FIGS. 8 and 9. Text recognition software or an optical recognition software could be used. The text in previous redacted documents could be used to identify text to be classified for exclusion. For example, use of software such as described in U.S. Patent Publication Nos. 2002/0158864, 2004/0075692, and 2005/0027495 could be used. The identity of the portion(s) to be classified for exclusion/inclusion in the rule set is then recorded for that type of document as indicated by block 146 for use in the future on similar types of documents (e.g., other arrest reports). As indicated by block 148, portion(s) could optionally also be identified to be included for use with block 140 shown in FIG. 10.

Figure 12:
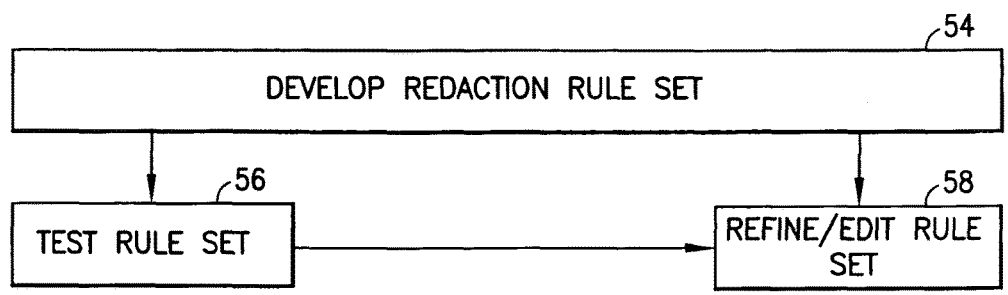
FIG. 12 is a flowchart depicting an example method.

Referring also to FIG. 12, once a rule set is developed as indicated by block 54, the rule set is preferably tested as indicated by block 56. Testing can also be conducted periodically after the rule set is in place. As indicated by block 58, the rule set can preferably be refined and edited. For example, names of police officers can change because of the addition of new police officers. The rule set could be edited to include the names of new police officers. In addition, if testing finds an error or conflict causing an error, the rule set can preferably be refined. However, conflicts should not occur. If a portion has a classification, and that classification has been indicated for exclusion, then it is to be excluded. Rules could also be auto-generated based upon subsequent manual redactions by users. The rules set could be accumulating for redaction maintenance. There could be automatic use of common rules for multiple users or documents or other specifics.

Figure 13:
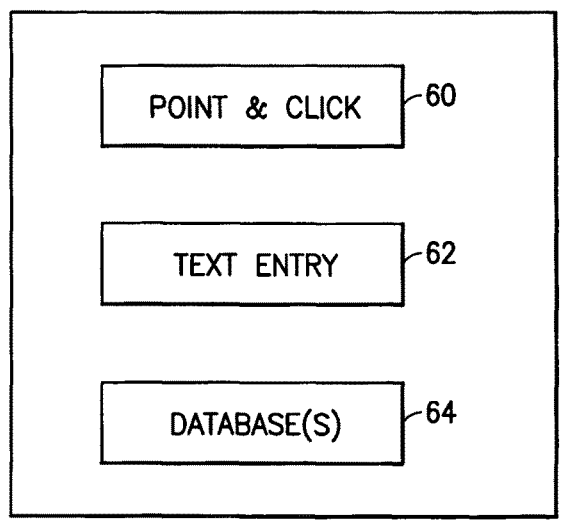
FIG. 13 depicts tools for use in entering rules into the rule set.

Referring now also to FIG. 13, identification of portions and text in a document for a rule set can comprise, for example, a point and click procedure with a mouse as indicated by block 60, a text or data entry by a keyboard as indicated by block 62, or import from another database as indicated by block 64. These are only some examples of how information can be input into a rule set. Any suitable alternative for data entry could be used including relationship correlation in text. For example:

If "X" before "Y", then redact "X" and "Y".

Figure 14:
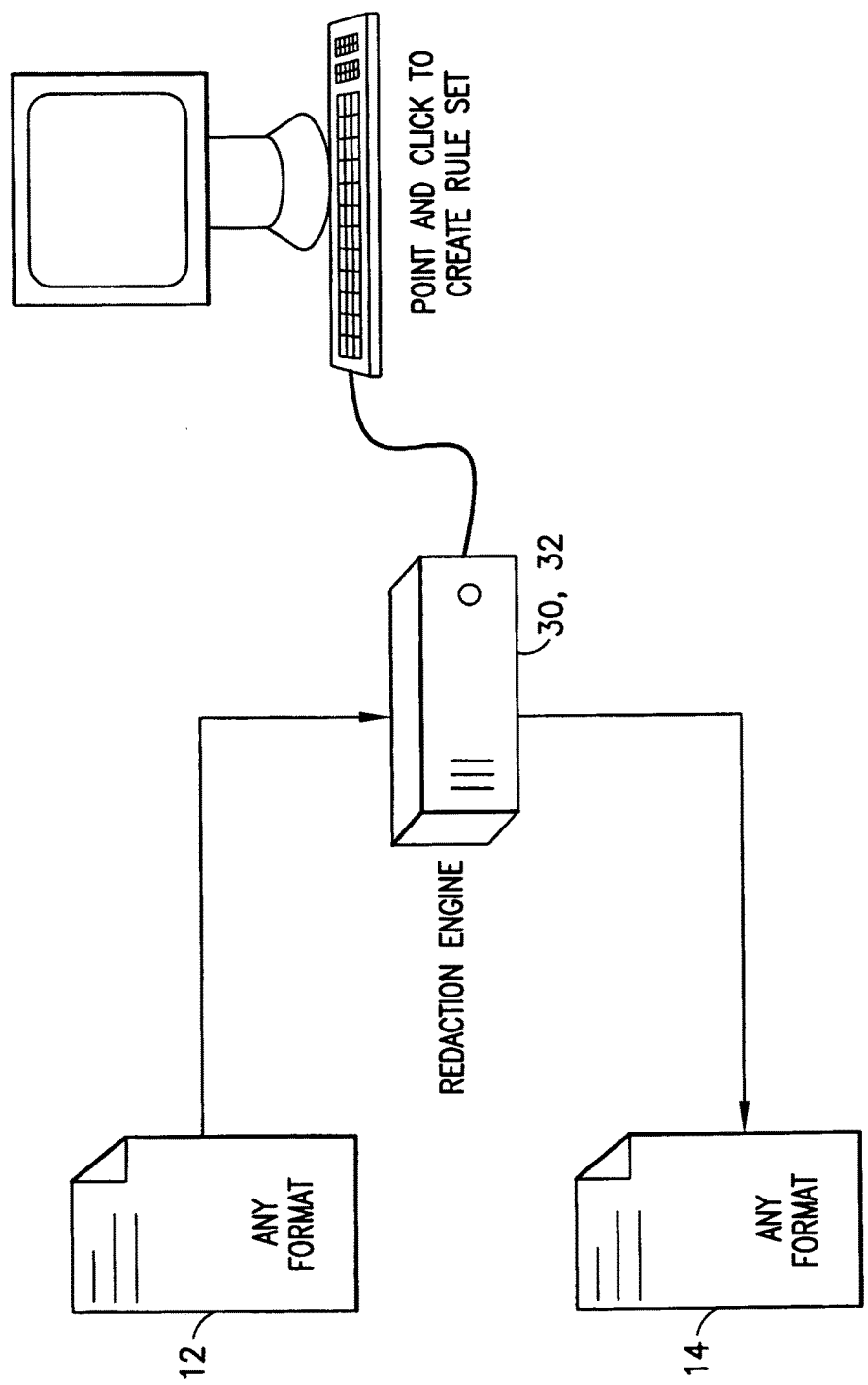
FIG. 14 depicts an aspect of the invention wherein the invention can operate on documents in any format.
Figure 15:
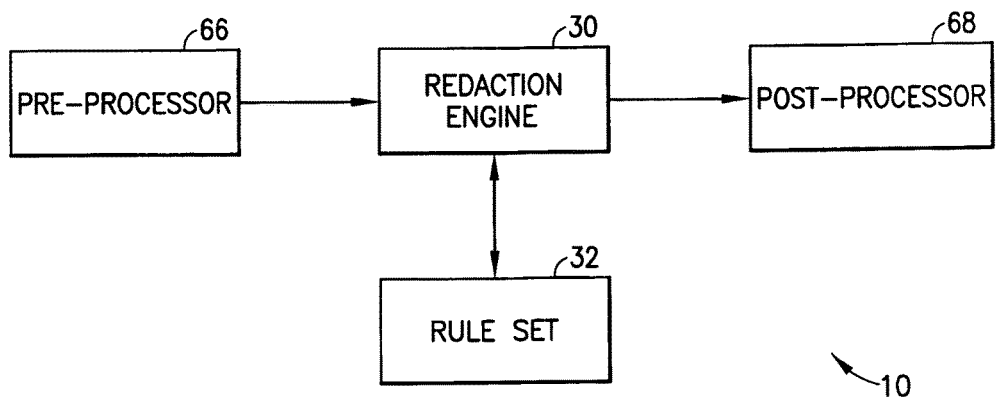
FIG. 15 is a block diagram of a system in accordance with an example.
Figure 16:
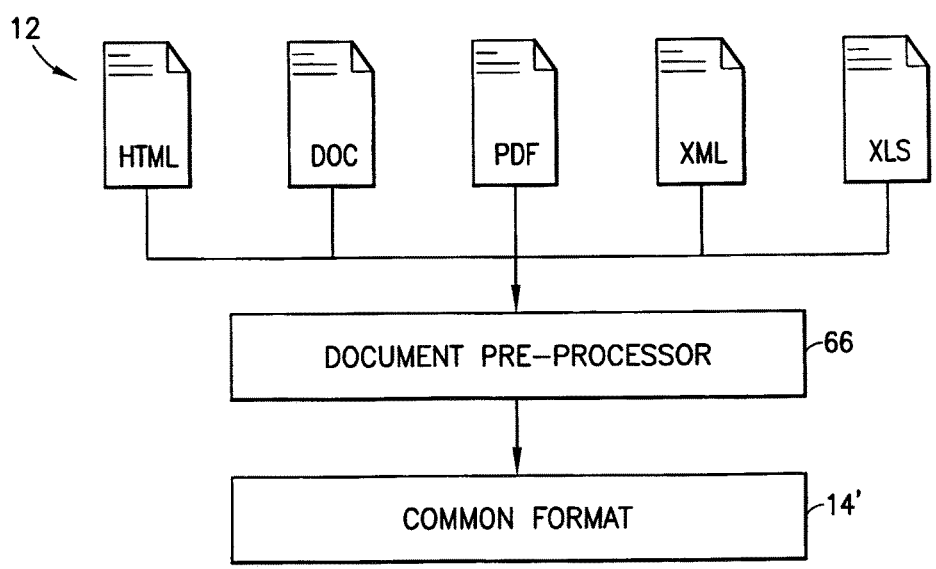
FIG. 16 is a block diagram depicting documents in several formats being input into a system operating in accordance with the invention for redaction purposes and being output in a common universal view format.
Figure 17:
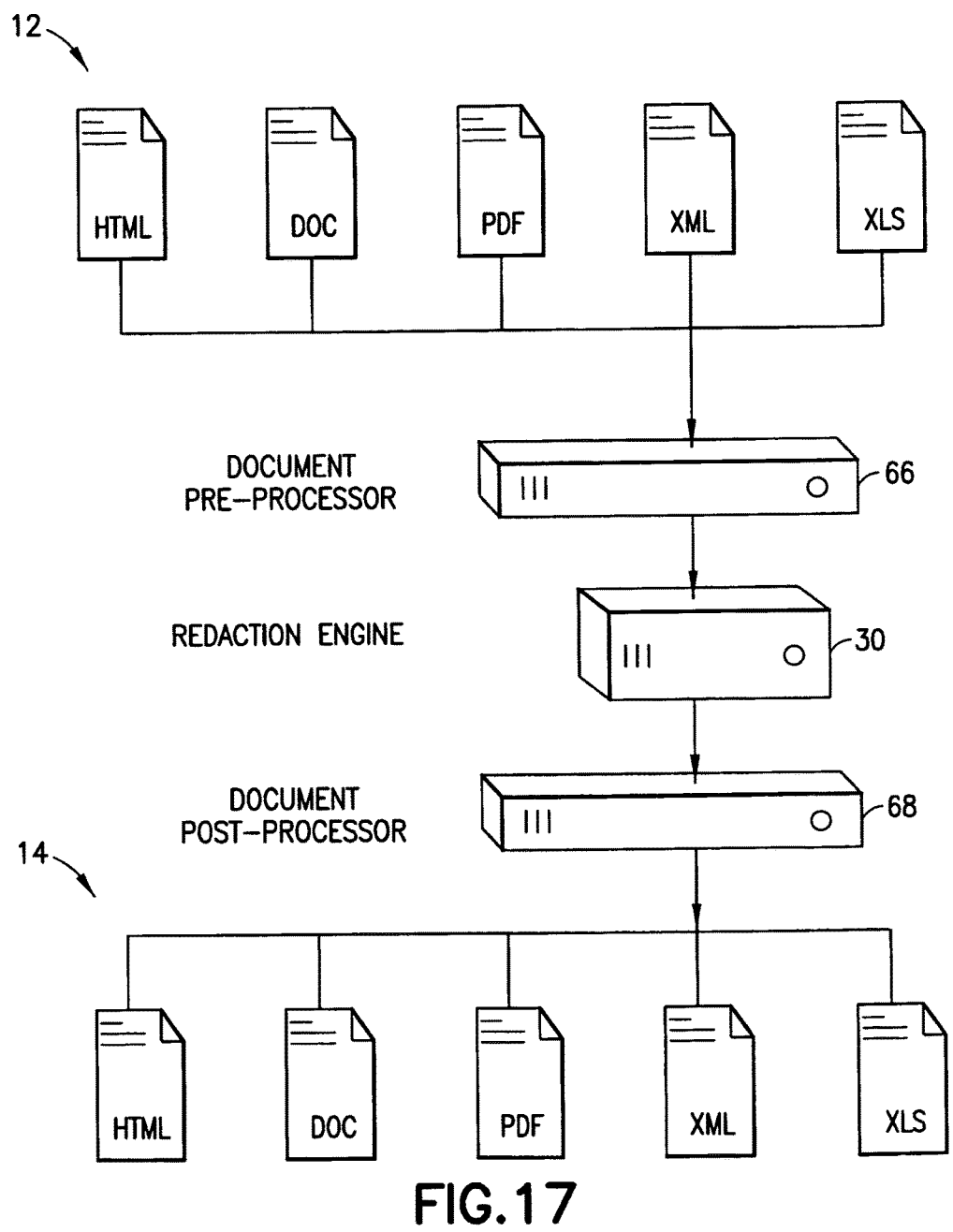
FIG. 17 is a block diagram depicting documents in several formats being input into a system operating in accordance with the invention for redaction purposes and being output in several formats.

Referring also to FIG. 14, in a preferred method the system is adapted to work with any suitable type of original document format and output any suitable type of modified document format. Referring also to FIGS. 15-17, the original document 12 could comprise any one of a plurality of different document formats. For example, the original document could comprise HTML, DOC, PDF, XML, or XLS format. The system could be adapted to work with any suitable format. Those formats mentioned above are merely examples. As illustrated in FIG. 15, the redaction system 10 can comprise a document pre-processor and a document post-processor 68. As seen with reference to FIG. 16, the document pre-processor 66 is adapted to convert the format of the original document 12 to a common format 14' such as WEBRECORDER™ XML format or CELWARE XML format by CelCorp Inc. for example. This allows a document to be broken into regions to be identified with the redaction rule set. After the redaction engine, the document post-processor 68 can convert the modified document from its common format 14' to a target format 14, such as a HTML, DOC, PDF, XML, or XLS format for example.

Figure 18:
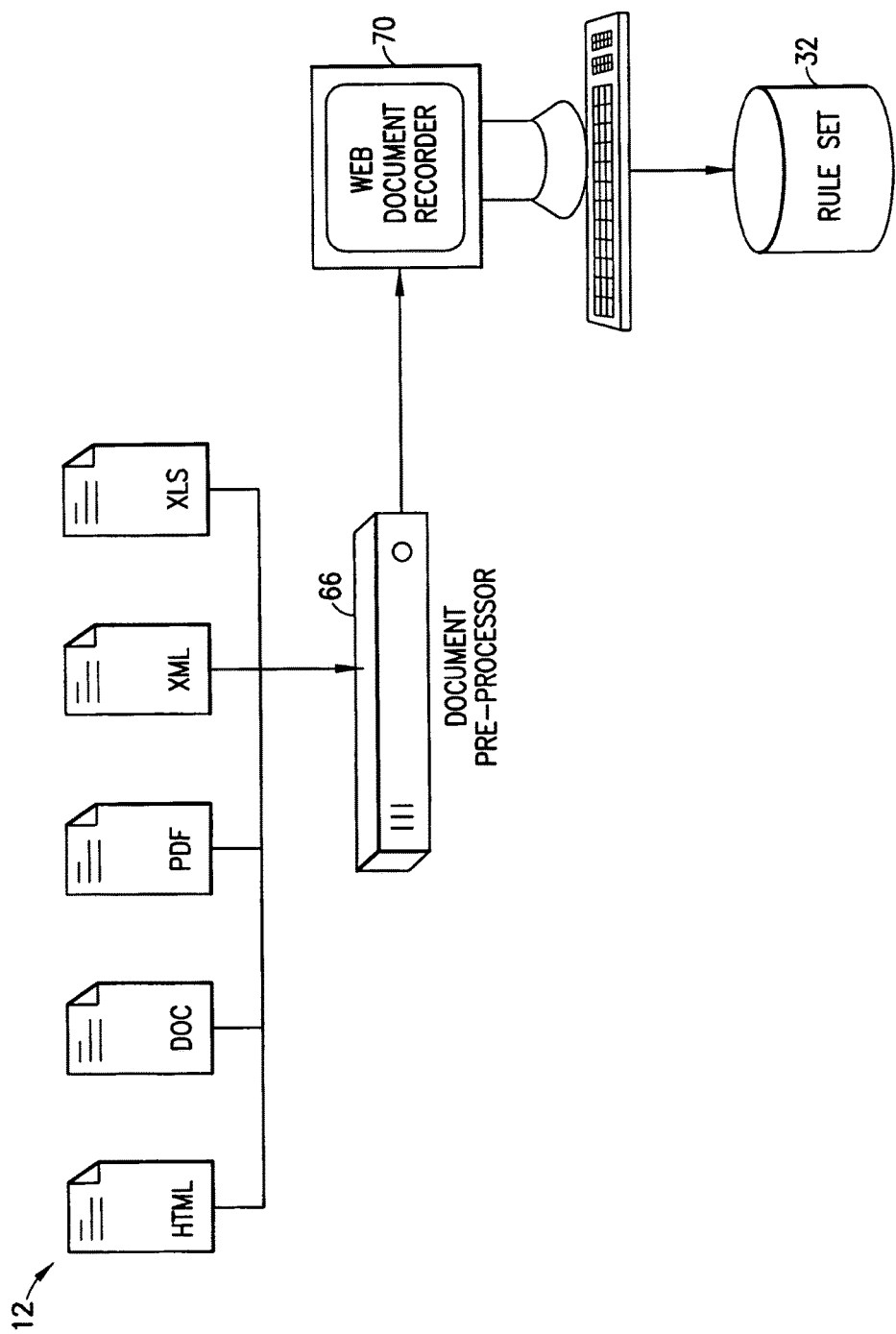
FIG. 18 is a block diagram of a system in accordance with the invention operating in a networked environment.

Referring also to FIG. 18, features of the present invention could be used over the Internet or on a web site. A web document recorder 70 could be connected to as a server for a web site. The recorder 70 could form a link to the documents via the Internet, but with the redaction engine running in the recorder 70. The recorder 70 could apply the rule set 32 as needed when the documents are viewed on the web site supported by the web document recorder 70.

Figure 19:
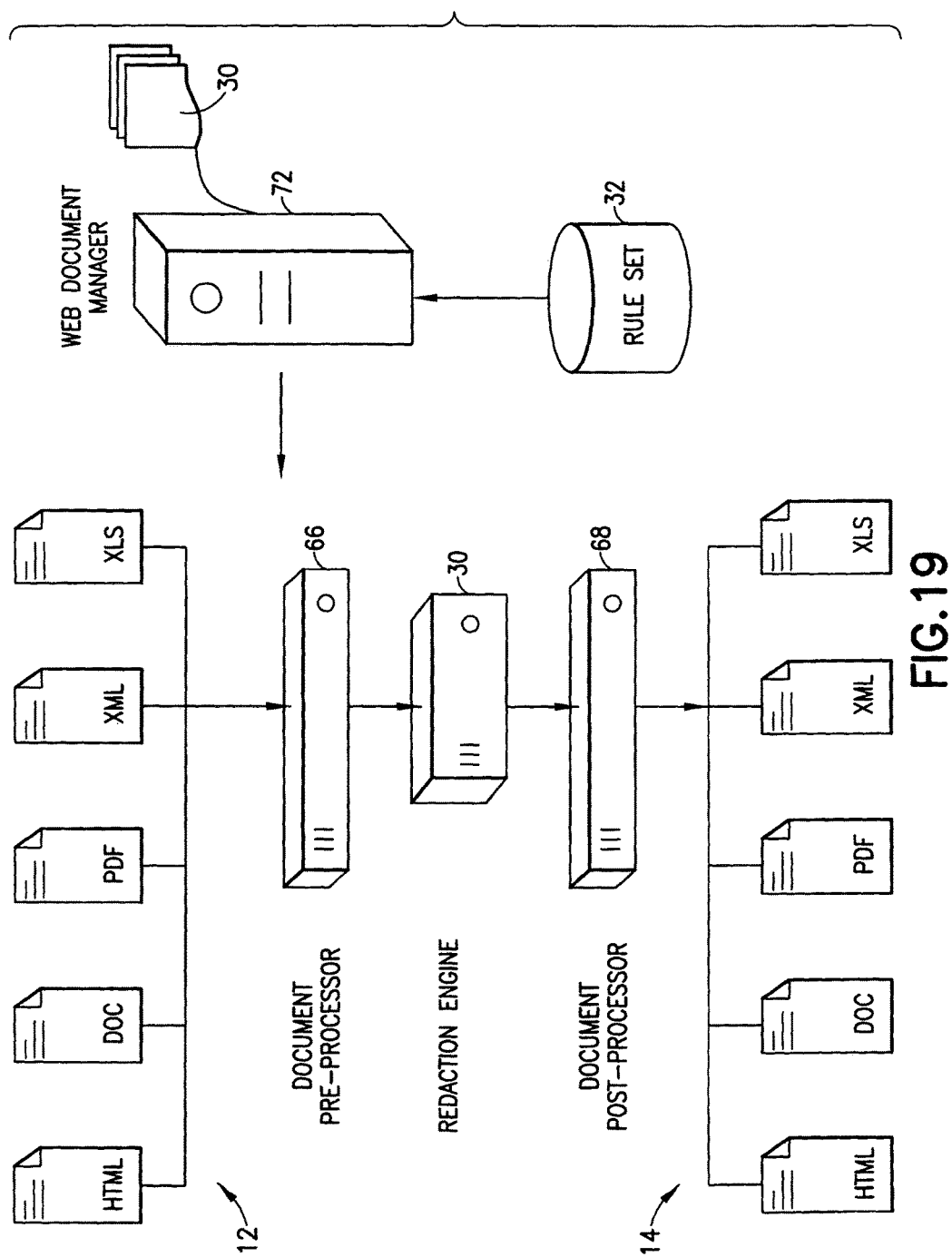
FIG. 19 is a block diagram of a system in accordance with another example operating in a networked environment.

Referring also to FIG. 19, features of the present invention could be used with a web document manager or server 72. The manager 72 could manage application of the rule set with the document pre-processor 66, redaction engine 30 and document post-processor 68. With this type of system the same rule set 32 could be used with multiple redaction engines.

Figure 20:
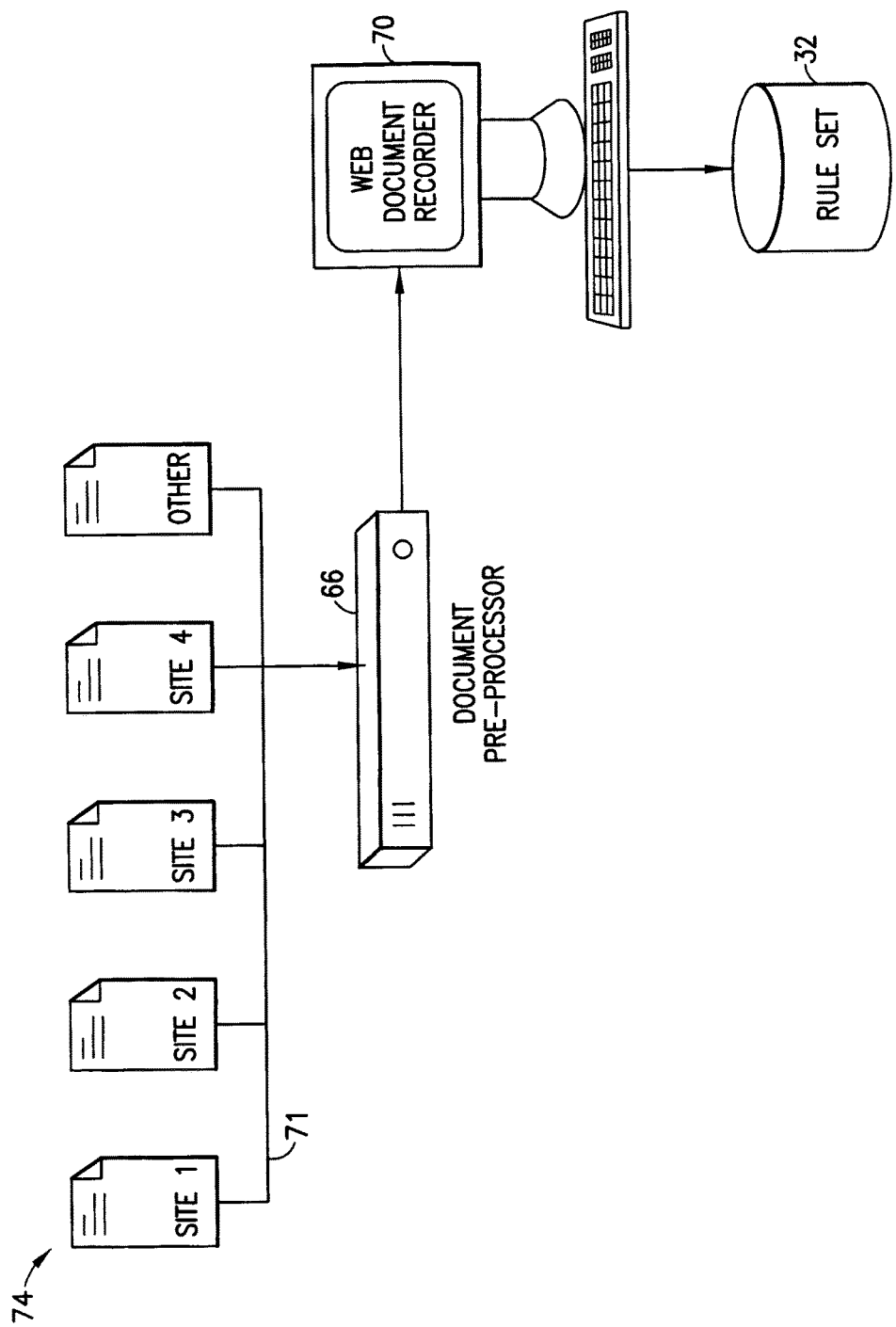
FIG. 20 is a block diagram depicting a system in which documents sourced from several sites over a network are input into a system for redaction purposes.

Referring also to FIG. 20, the system shown in FIG. 18 could be used in connecting documents from multiple sites 74 to the web document recorder 70 such as 71 symbolizing the Internet or a computer network.

Figure 21:
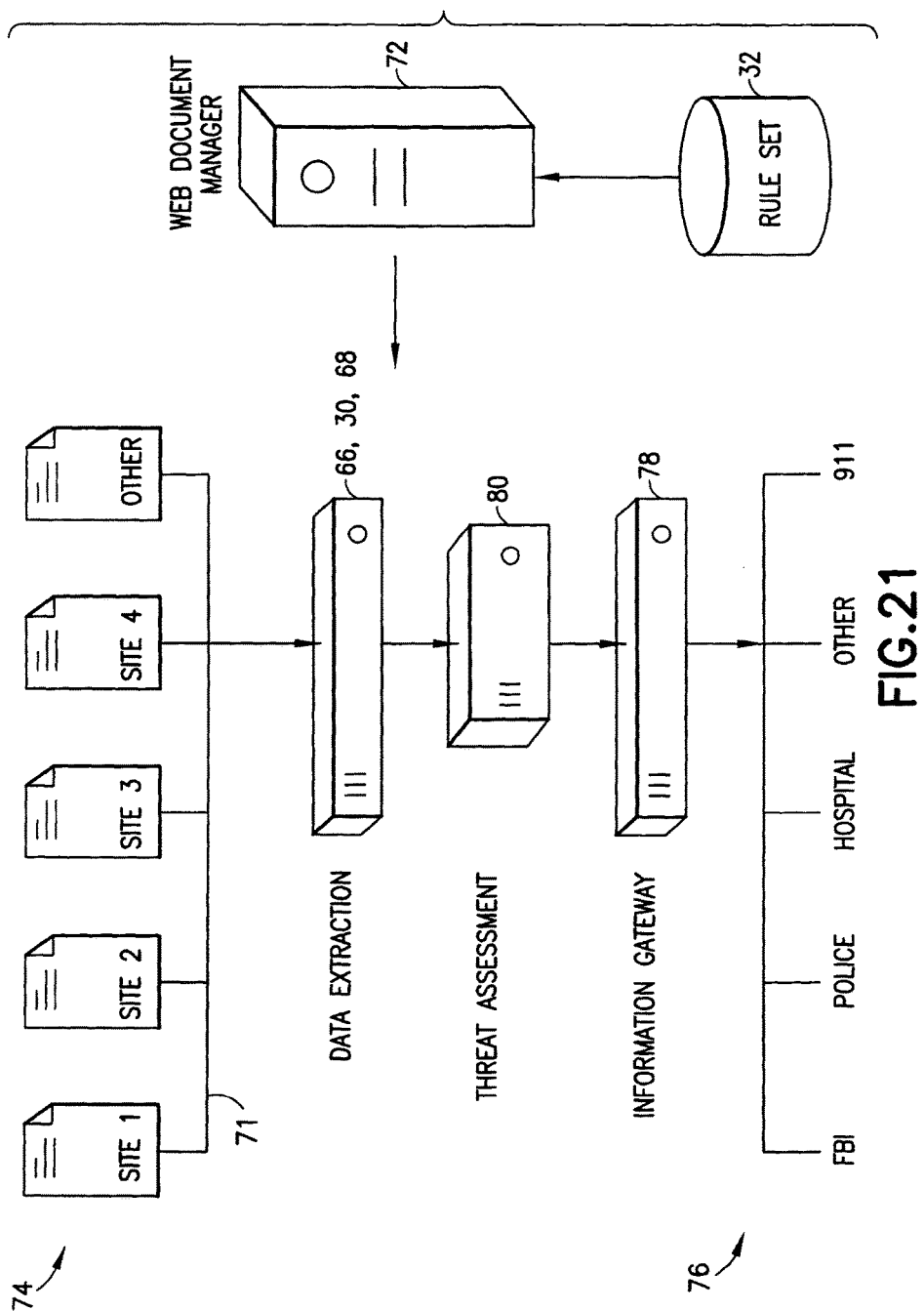
FIG. 21 is a block diagram depicting a system in which documents sourced from several sites over a network are input into a system for redaction purposes and then made available over a network following redaction.
Figure 22:
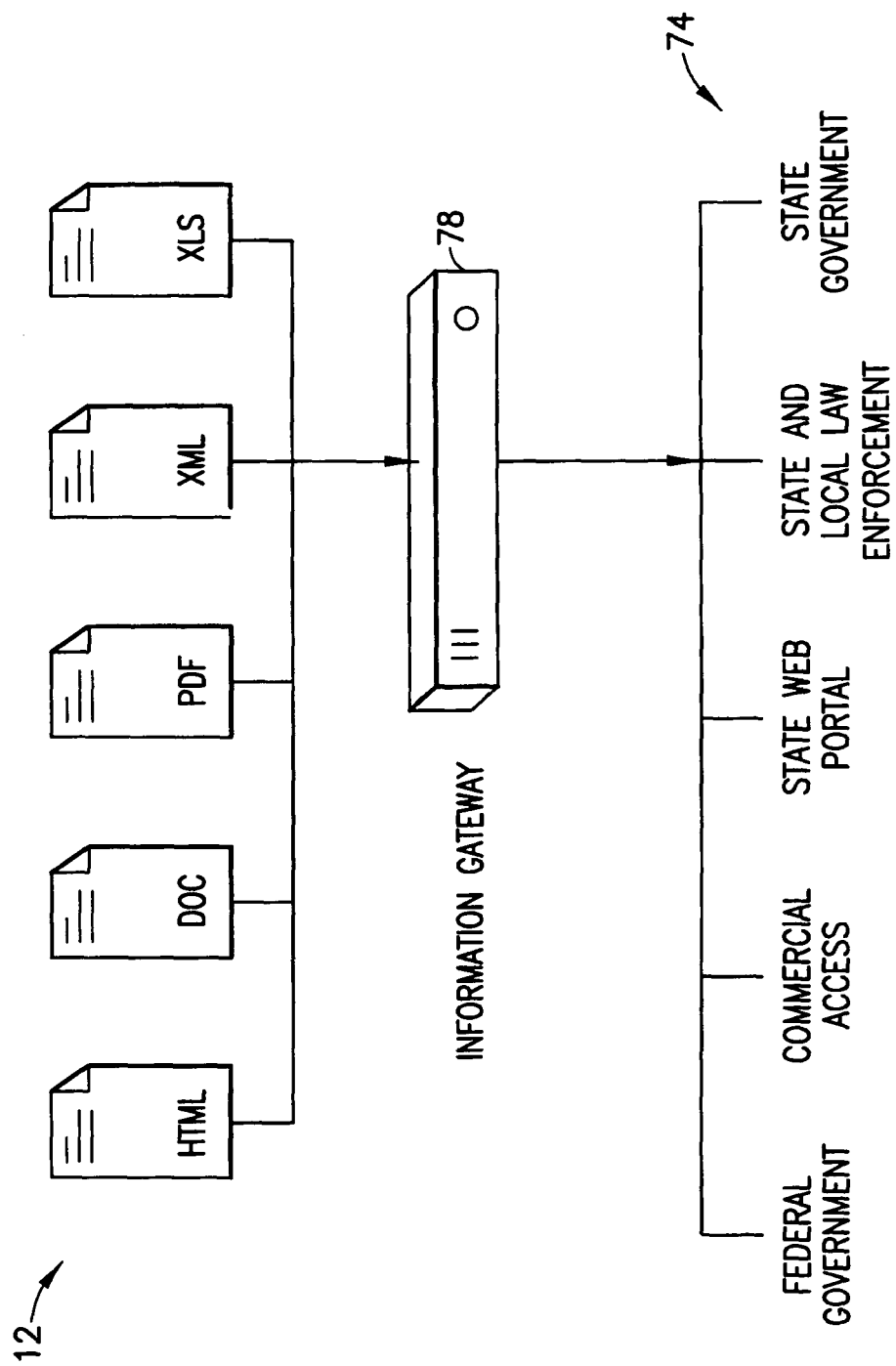
FIG. 22 is a block diagram depicting a system in which documents in several formats are made available over a network following redaction.

Referring also to FIG. 21, the system shown in FIG. 19 could be used in connecting documents from multiple sites 74 to multiple agencies 76 with the addition of an information gateway 78 and perhaps a threat assessment system 80. For example, the agencies could comprise the FBI, Police, Hospitals, 911 service, or other agency. The threat assessment system 80 could record web process, automate the web process, and correlate information across web sites and other information sources. Referring also to FIG. 22, the Gateway 78 can be adapted to sort and route information such that information is available to users on a predetermined basis, such as by document type or information in the portions of the documents for example.

With the invention, documents could be redacted in real time or, alternatively, the documents could be pre-redacted and stored for subsequent viewing. Alternatively, the system could be adapted to redact documents in real time, but once redacted store the redacted document for subsequent viewing without further automated redaction being needed for the same document. In other words, a library of redacted documents could be created over time. A batch of documents could also be redacted and stored if desired for an immediate library or database of redacted documents, thus allowing separation of the redacted document database from more secure original document databases.

The methods depicted and described herein can be tangibly embodied as a computer program in a computer-readable memory medium. Such computer-readable memory media comprise an aspect of the invention. Instructions of the computer program perform operations in accordance with the methods of the invention when executed by digital processing apparatus. Tangible computer-readable memory media included, but are not limited to, hard drives, CD- or DVD ROM, flash memory storage devices or RAM memory of a computer system.

With the invention, a system can be provided comprising a source of electronic documents to be redacted; a source of redaction rules; a redaction engine coupled to the source of electronic documents and the source of redaction rules, the redaction engine configured to redact the electronic documents in accordance with the redaction rules contained in the source of redaction rules, the redaction engine configured to perform operations, the operations comprising:
  accessing electronic documents to be redacted;
  accessing redaction rules from the source of redaction rules;
  redacting the electronic documents in accordance with the redaction rules, creating redactions in the electronic documents; and
  generating tangible versions of the electronic documents containing the redactions.

The source of electronic documents can comprise an electronic database. The source of electronic documents can comprise an electronic database accessible over a network. Generating a tangible version can comprise displaying redacted versions of the electronic documents on a display screen. Redacting the electronic documents in accordance with the redaction rules can comprise identifying the electronic documents by document type; selecting redaction rules to be applied to the electronic documents in dependence on the identified document type; and redacting the electronic documents in accordance with the selected redaction rules.

The electronic documents can comprise categories of information; where the redaction rules specify which categories of information are to be redacted; and where redacting the electronic documents in accordance with the redaction rules further comprises redacting information contained in the electronic documents corresponding to the categories of information specified in the redaction rules. The categories of information can comprise text information. The categories of information can comprise graphical information. The graphical information can comprise an organization logo. The categories of information can comprise visual information. The visual information can comprise photographic information. The electronic documents can comprise a plurality of document portions, where the selected redaction rules specify which document portions are to be redacted, and where redacting the electronic documents in accordance with the selected redaction rules further comprises redacting the document portions in the electronic documents specified in the selected redaction rules. The electronic documents can comprise categories of text, where the selected redaction rules specify which categories of text are to be redacted, and where redacting the electronic documents in accordance with the selected redaction rules further comprises redacting text in the electronic document corresponding to categories of text specified in the selected redaction rules. The electronic documents can contain identification codes identifying document type, and where identifying the document further comprises detecting the identification codes in the electronic documents to determine document type.

The identifying the electronic documents by document type can comprise receiving inputs identifying the electronic documents by document type. Identifying the electronic documents by document type can comprise using pattern recognition to identify the electronic documents by document type. Document redaction can be performed in real time. The electronic documents can be stored in unredacted form and wherein redacting the electronic documents in accordance with the redaction rules is performed in real time when a user not entitled to view in unredacted form an electronic document contained in the source of electronic documents accesses the electronic document. Redacting the electronic documents in accordance with the redaction rules can be performed prior to requests for electronic documents contained in the source of electronic documents, the operations further comprising: saving to memory redacted electronic documents.

The source of electronic documents can comprise a scanning system configured to convert hard copies of documents to electronic documents; and a database configured to store the electronic documents created by the conversion. Redactions can be reflected in the tangible version by redaction indicia, the redaction indicia identifying what categories of information have been redacted in the electronic documents. Redactions might not be identified by redaction indicia, the absence of redaction indicia masking what categories of information have been redacted in the electronic documents. The source of redaction rules can comprise a redaction rule entry system configured to receive redaction rules to be used when performing redaction operations. The redaction rule entry system can comprises a redaction rule editing system for editing pre-existing redaction rules comprising the source of redaction rules. The redaction rule entry system can be configured to receive commands associating redaction rules with specific electronic document types, wherein a particular redaction rule associated with a particular electronic document type is used when redacting electronic documents corresponding to the particular electronic document type.

The source of redaction rules can comprise rules specifying portions in electronic documents to be reproduced without redaction. The operations can comprise identifying portions in electronic documents corresponding to portions the redaction rules specify are to be reproduced without redaction; reproducing the identified portions without redaction. The system can further comprise a manual redaction entry system configured to allow users to manually redact electronic documents; and where the source of redaction rules further comprises an automated system configured to monitor patterns of manual redactions entered by users and to generate redaction rules in dependence on the monitoring activity.

The source of redaction rules can comprise rules specifying categories of information to be reproduced without redaction. At least one of the categories of information can comprise text information. At least one of the categories of information can comprise graphical information. At least one of the categories of information can comprise visual information. The visual information further can comprise photographic images. The system is can be configured to redact electronic documents recorded in a plurality of different electronic formats.

The system can further comprise an electronic document pre-processor configured to identify which electronic format a particular electronic document is recorded in and to convert the particular electronic document to a common electronic format. Redacting the electronic documents in accordance with the redaction rules can comprise performing the redaction operations on the electronic documents when the electronic documents are in the common format. The electronic document pre-processor can be configured to impose a portion format on a particular electronic document in dependence on redaction rules contained in the source of redaction rules. Redacting the electronic documents in accordance with the redaction rules can comprise redacting portions generated in the particular electronic document by the imposition of a portion format. The system can further comprise an network gateway for disseminating redacted electronic documents to users.

A computer program product can be provided comprising a computer readable storage medium storing a computer program configured to perform redaction operations when executed by digital processing apparatus, the operations comprising:
accessing an electronic document to be redacted;
accessing at least one redaction rule to be applied to the electronic document;
redacting the electronic document in accordance with the redaction rule; and
storing the redacted electronic document in computer memory.

The computer program product operations can further comprise generating a tangible version of the redacted electronic document. The computer program product can generate a tangible version of the redacted electronic document and further comprises displaying the redacted electronic document on a display device. The computer program product can generating a tangible version of the redacted electronic document further comprising printing a hard copy of the redacted electronic document. The computer program product operations can further comprise: after accessing the electronic document to be redacted and prior to redacting the electronic document, converting the electronic document into a different electronic format, and wherein redacting the electronic document further comprises redacting the electronic document in the different electronic format. The computer program product operations can further comprise converting the redacted electronic document into a different electronic format.

With the invention a method can be provided comprising receiving redaction rules to be used in redacting electronic documents, where the redaction rules are specified in dependence on document type; storing the redaction rules to a computer memory, the computer memory comprising a source of redaction rules; accessing an electronic document to be redacted from a source of electronic documents; identifying the electronic document to be redacted by document type; accessing redaction rules from the source of redaction rules appropriate for use in redacting the type of document to which the electronic document corresponds; redacting the electronic document in accordance with the redaction rules specified for the document type to which the electronic document corresponds, creating redactions in the electronic document; and generating a tangible version of the electronic document containing the redactions.

Figure 23:
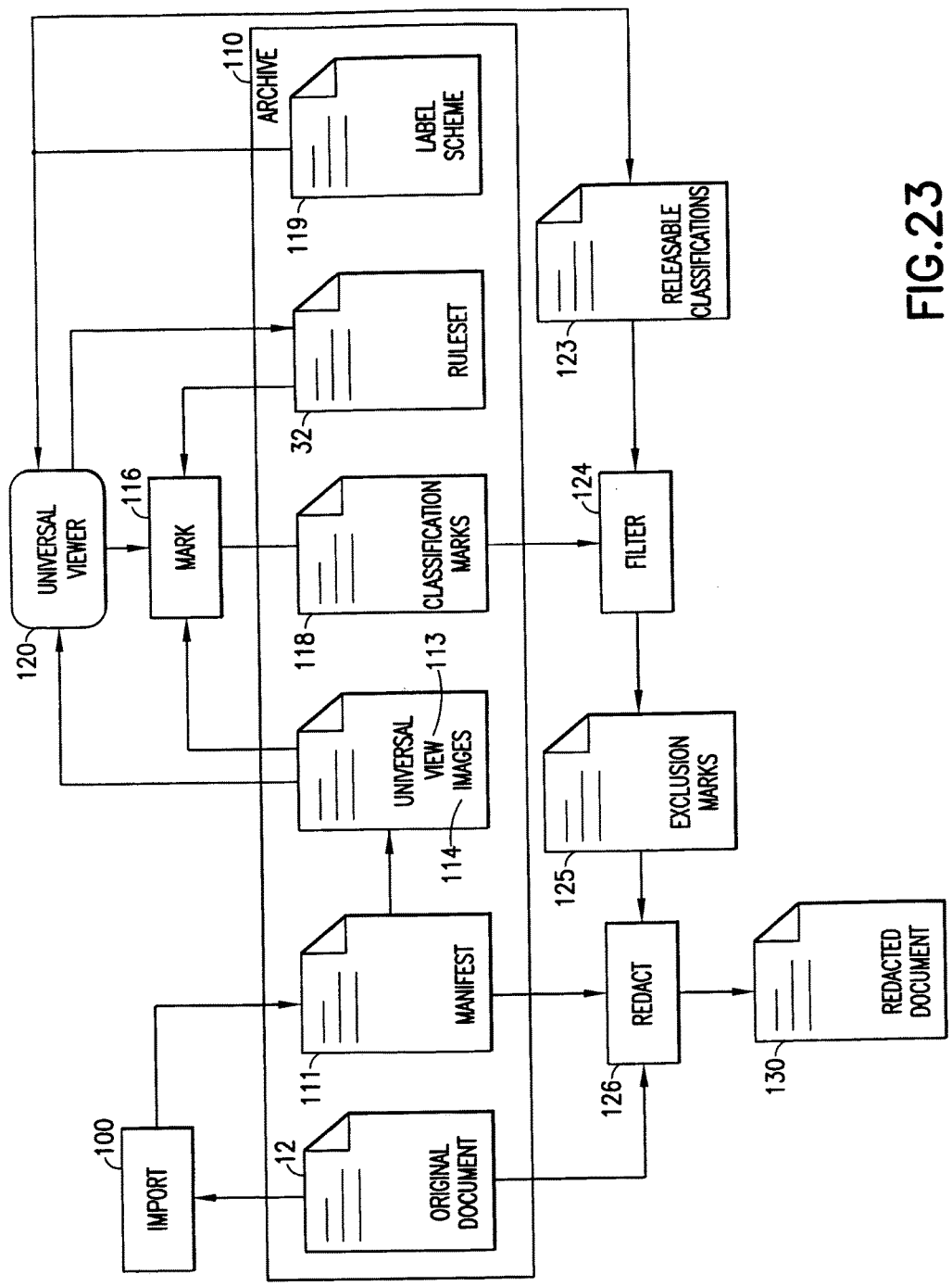
FIG. 23 is a diagram illustrating components and steps of one example.

Referring also to FIG. 23, a diagram is shown of a system 101 which can include redaction in combination with classification and archiving for format independence. A document 12 can be imported 100 into the system. The document 12 is usually a format dependent document. For example, a MICROSOFT WORD document is a type of format dependent document having information regarding formatting, layout, fonts, bold, italics, etc. During the import step 100, the information in the document 12 is mapped to create a logical manifest 111. The logical manifest 111 comprises a standard logical manifest of everything from the original document 12 and an address unique ID number for every portion or element of the document 12, such as OOXML.

After the initial import logical manifest 111 is created, a universal view 113 with images 114 is also created. The universal view 113 is a format independent view having element-by-element backlinks to the logical manifest 111. In this example embodiment, the system has at least one ruleset 32 which comprises rules for identifying and classifying information. The ruleset 32 (e.g. FIG. 24) is used to identify information elements in the universal view 113 (e.g. FIG. 25) and create classification marks 118 (e.g. FIG. 26). The classification marks 118 can be any suitable type of classification, for example, "Top Secret" and "Secret", and "SSN". This is obviously only one example. Thus, classification marks 118 are created with one or more classifications for one or more of the elements in the universal view 113. The logical manifest 111, universal view 113 with images 114 and the classification marks 118 (having at least one classified element) can then be stored in the archive 110; perhaps along with the original document 12.

The universal view 113 with images 114 for each document can be accessed by a viewer/editor 120. A person at the viewer/editor 120 can review the information in the universal view 113 with images 114 and the classification marks 118, and add, change, or delete classification marks 118. In a preferred embodiment the logical manifest 111 and universal view 113 with images 114 never change. Only the classification marks 118 might need to be added, modified, or deleted. Review with viewer 120 of the classification marks 118 might not be necessary for every document. For example, it might merely be done for a few test documents such that the ruleset 32 can be generated or updated based upon the classification marks 118 made by the user at the viewer/editor 120. For documents containing very sensitive or top secret information, the additional user review (quality assurance) via the viewer editor 120 might be done for every such document.

With one embodiment of the invention, the person at the viewer/editor 120, performing the review process, can be provided with a format independent universal view 113 with images 114 of the input document 12, and their respective computer generated classification marks 118 for review. The person can use any classification system they want in the ruleset 32. When they wish to release a document the universal viewer will prompt them for the releasable classifications 123. The filter 124 will then determine which classification marks 118 will become exclusion marks 125 when creating the redacted document 130 via the engine 126. As an alternative to pre-existing classification systems which a company or government agency might already have in place, the redaction system can include and use its own classification label scheme 119. The label scheme comprises the labels which are assigned to users at the universal viewer 120 relating to their classification authorization. In other words, a person who is authorized to see "Top Secret" information must have a "Top Secret" or higher classification assigned to him/her. The label scheme is, thus, the nomenclature used for a classification system. The label scheme 119 can include both independent and dependent labels. One example of dependent labels would be classifications such as "Secret" and "Top Secret" for example which could be supplied to the owner of the document by a vendor operating the archiving system 101 for example. An example of an independent label would be "Social Security Number". Another alternative to the owner created/specified classification could be a simple single classification of "redact".

The review process can go back and forth multiple times between mark steps 116 performed directly by the human reviewer at the viewer/editor 120 and indirectly using rulesets 32.

Release of information from each document stored in the archive 110 preferably comprises a filter step 124 and then a redaction step 126. The filter step 124 compares the classification marks 118 for each element of the document such as 18-29 for example (or an overall classification for the document) to the releasable classifications 123 to select the exclusion marks 125 to be used in the redaction step 126. As an example, for the universal view 113 in FIG. 25 and label scheme 119 in FIG. 27, different releasable classifications 125 will result in different redacted documents 130. In one example shown in FIG. 28 the releasable classifications 123 include "Secret" but not "SSN", so exclusion marks 125 are created for any classification marks with "Top Secret" or "SSN", but "Secret" classified elements will not be redacted. In another example shown in FIG. 29 the releasable classifications 123 include "Top Secret" but not "SSN", so exclusion marks 125 are created for any classification marks with "SSN". In another example FIG. 30 the releasable classifications 123 include "Secret" and "SSN", so the exclusion marks 125 are created for any classification marks with "Top Secret", but not "Secret" or "SSN" classified elements. For some documents, such as where an entire document is classified as "Top Secret", and the classification 123 is at a level less than "Top Secret", any release of information regarding the document might be stopped.

Figure 31:
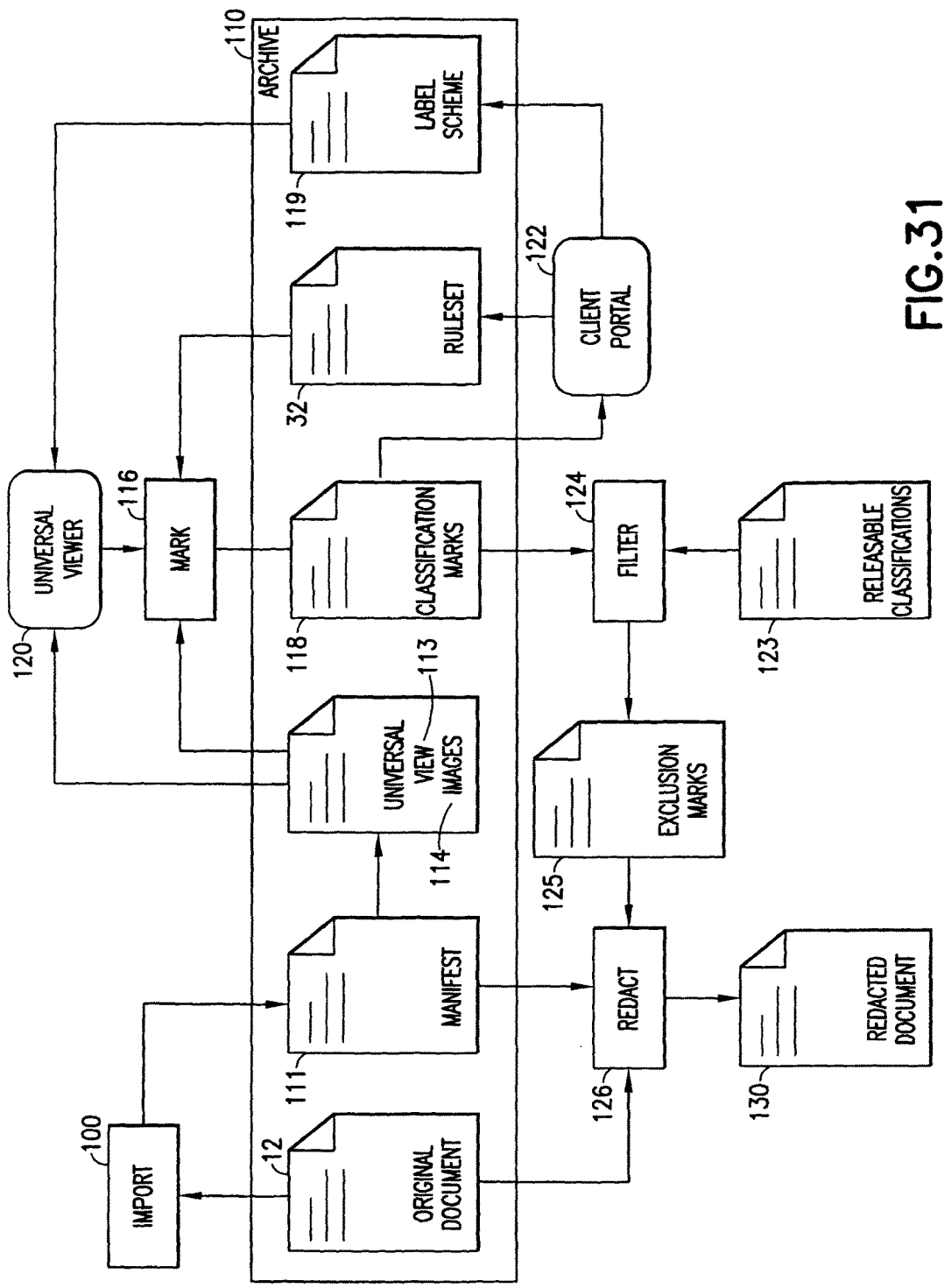
FIG. 31 is a diagram similar to FIG. 23 illustrating components and steps of one example.

Referring also to FIG. 31, another diagram is shown of a system 101. Document redaction can also be controlled by an external client portal 122 that provides release classifications 123. For example, a user at the portal 122 may have to sign in with a user ID to gain access to specific releasable classifications 123. For the example classification given above, releasable classifications 123 for the user ID might be "Secret" and, thus, the user ID would be allowed to access "Secret" documents, but not "Top Secret" documents. For some documents, such as where an entire document is classified as "Top Secret", and the releasable classifications 123 does not contain "Top Secret", any release of information regarding the document might be stopped.

Figure 32:
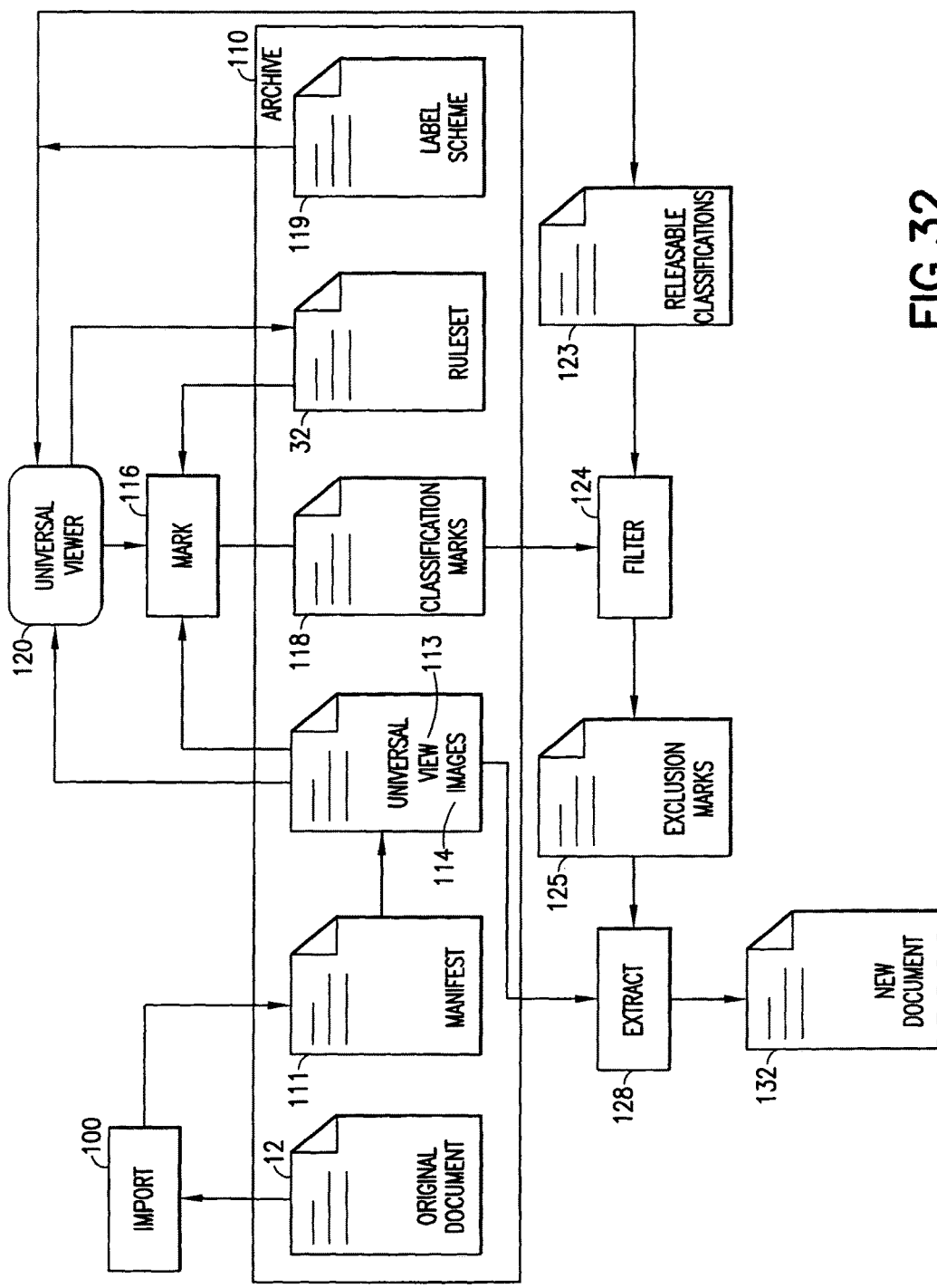
FIG. 32 is a diagram similar to FIG. 23 illustrating components and steps of another example.
Figure 33:
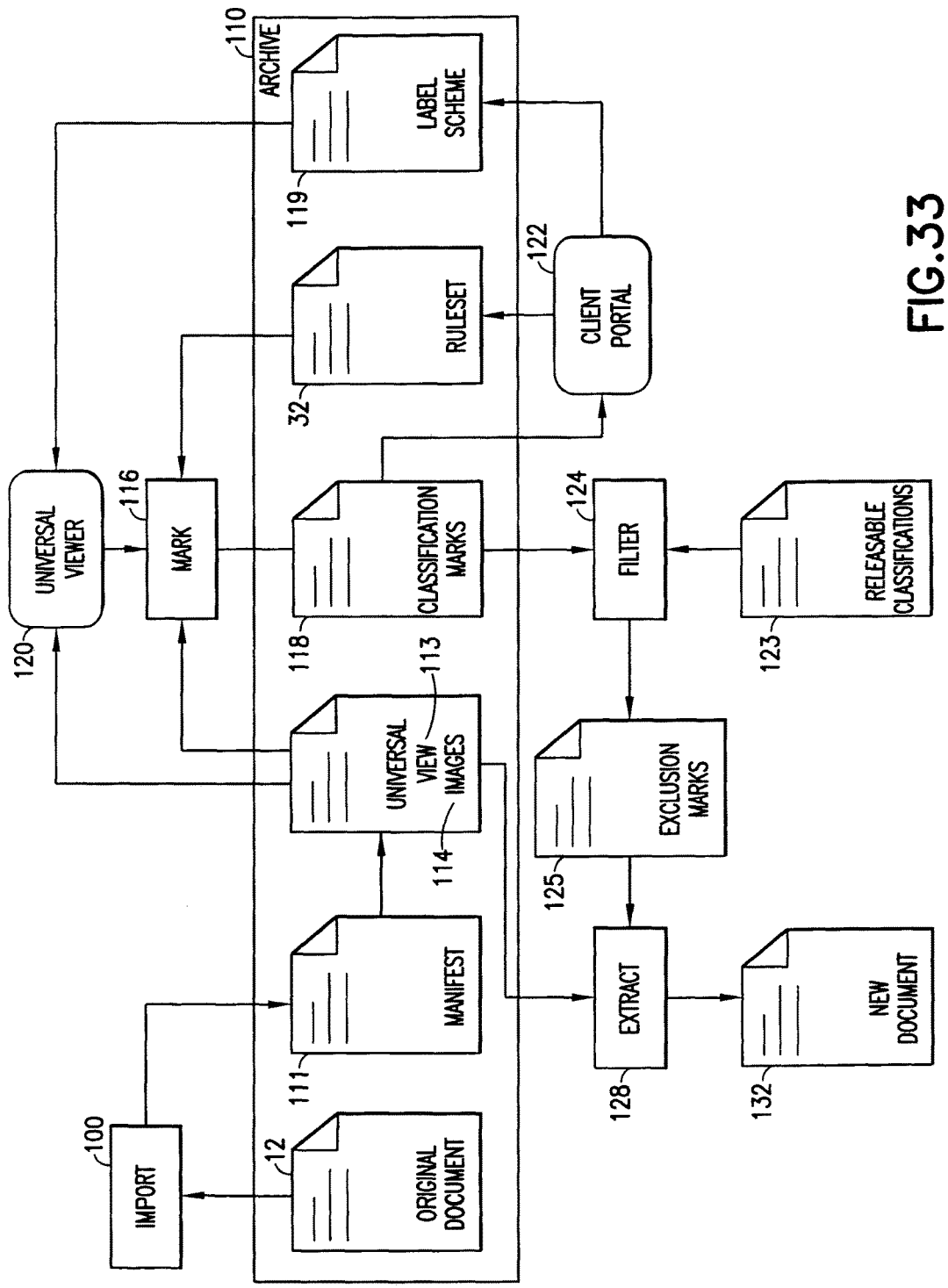
FIG. 33 is a diagram similar to FIG. 23 illustrating components and steps of another example.

Referring also to FIGS. 32 and 33, further diagrams are shown of system 101. The system could extract 128 content without exclusion marks 125 from the universal view 113 with images 114 rather than redacting 126 the original document 12. The extracted information can be used to generate a new document 132. For example, for an employee record, the owner of the document might classify payroll information at a level "A", home contact information at level "B" and medical information at level "C". People with classifications could have levels "A" and/or "B" and/or "C" as part of their classification access. The extraction step 130 could then produce a new document 132 for the portal 122 based upon the user's classification and the classification of individual elements of the document as "A" or "B" or "C" classified information. For example, if the user only had levels "A" and "B" in their releasable classifications 123, then the new document 132 would have document element(s) classified as "A" and "B" shown, but the new document 132 would not have document element(s) classified as "C" shown. The document element(s) classified as "C" would be totally absent. Sub-information in A and B could be redacted with exclusion marks 125. For example, if "A" is an element corresponding to a nine digit social security number portion of a document, and "D" is an element corresponding to the last four digits of the social security number portion of a document, the system could identify "A" to be used in the new document, and the system could identify "D" as not being redacted, then the new document 132 could be created using the information of the nine digit social security number, but only the last four digits would not be redacted (the first five digits would be redacted).

The system could perform the filter step 124 before the system performs the extraction 128. The filter step 124 can compare classification marks 118 to release classifications 123 and mark individual elements of the document for exclusion 125. The releasable classification(s) 123 could be arbitrarily set by the owner of the document (perhaps based upon their own security requirements or security system for example).

With this type of system the owner of the document can specify its own redaction classification nomenclature or categories for each document element. A supplier or vendor which operates the systems 101 does not need to use a same classification(s) for each owner of documents stored in the archive 110. The owner can, thus, use or create redaction classification nomenclature or categories of their own, such as specific to their type of documents; irrespective of what others might be using. A feature of one embodiment of the invention, however, is that the system 101 could be able to work with all these different classifications at the same time.

In order to produce the end product document (the redacted document 130, or the new document 132) the system can use the universal view 113 with images 114 and exclusion marks 125. The exclusion marks 125 are based upon what the portal 122 has requested and what the system has determined is appropriate based upon the classification 123 and the classification marks 118 to release the redacted document 130 or new document 132.

Classifications are able to overlap on same portions. For example, for a social security number the last four digits are sometimes used on a report where the first five digits are redacted. Thus, the first five digits could be given a classification Secret, and the total nine digit social security number could be given a classification SSN. In this example SSN overlaps Secret. In order for a redacted document 130 to include the entire nine digits of the social security number, the releasable classifications 123 would need to include both classifications: A and B. If the releasable classifications 123 do not include "Secret", the portions of the document with secret classification marks 118 would be redacted from the released document.

There may be some instances where a document element has more than one classification or partially overlapping classifications. For example, for an employee's social security number, the whole social security number could have a classification mark 118 of "A", and the last six digits of the social security number could have a classification mark 118 of "B", and the last four digits of the social security number could have a classification mark 118 of "C". Thus, the middle two digits of the social security number could have three different classifications marks 118. An embodiment of the invention can allow for these overlapping or partial classifications to be used in properly storing information in the archive 110 for subsequent export into the end product document 130, 132 as noted above. This allows three different users (each having the different releasable classifications 123 "A", "B", "C") to extract and/or see the non-redaction portion of their respective classification authorized level of information (the whole number, the first five digits, or the last four digits, respectively). With one embodiment of the invention, the exclusion marks can be selectively applied back to the logical manifest 111 to immediately edits the original document 12 to create a redacted document 130. In another example, the exclusion marks can be applied to the universal view 113 with image 114 to create a new document 132 for export/output. After the redacted document 130 or original document has been prepared it can be converted to other formats such as PDF.

With one embodiment of the invention, three independent features can be provided including a system 101 which can operate:

regardless of what type of document the original document was (so long as the software and ruleset have been prepared to properly create the import map and the logical map);

regardless of whether the end product document is a redaction, an extract or a redacted extract; and regardless of the type of classification system that is being used (such as a standard type of classification system or an owner created classification system).

In addition, because all the information from the original document is stored in the archive 110, the original document can also be created without having to store the original document per se. In other words, the elements 18-29 can be stored in the archive 110 with their classification and the import map and logical map without actually storing the document 12 in its original form. This can save space in the archive 110.

Figure 34:
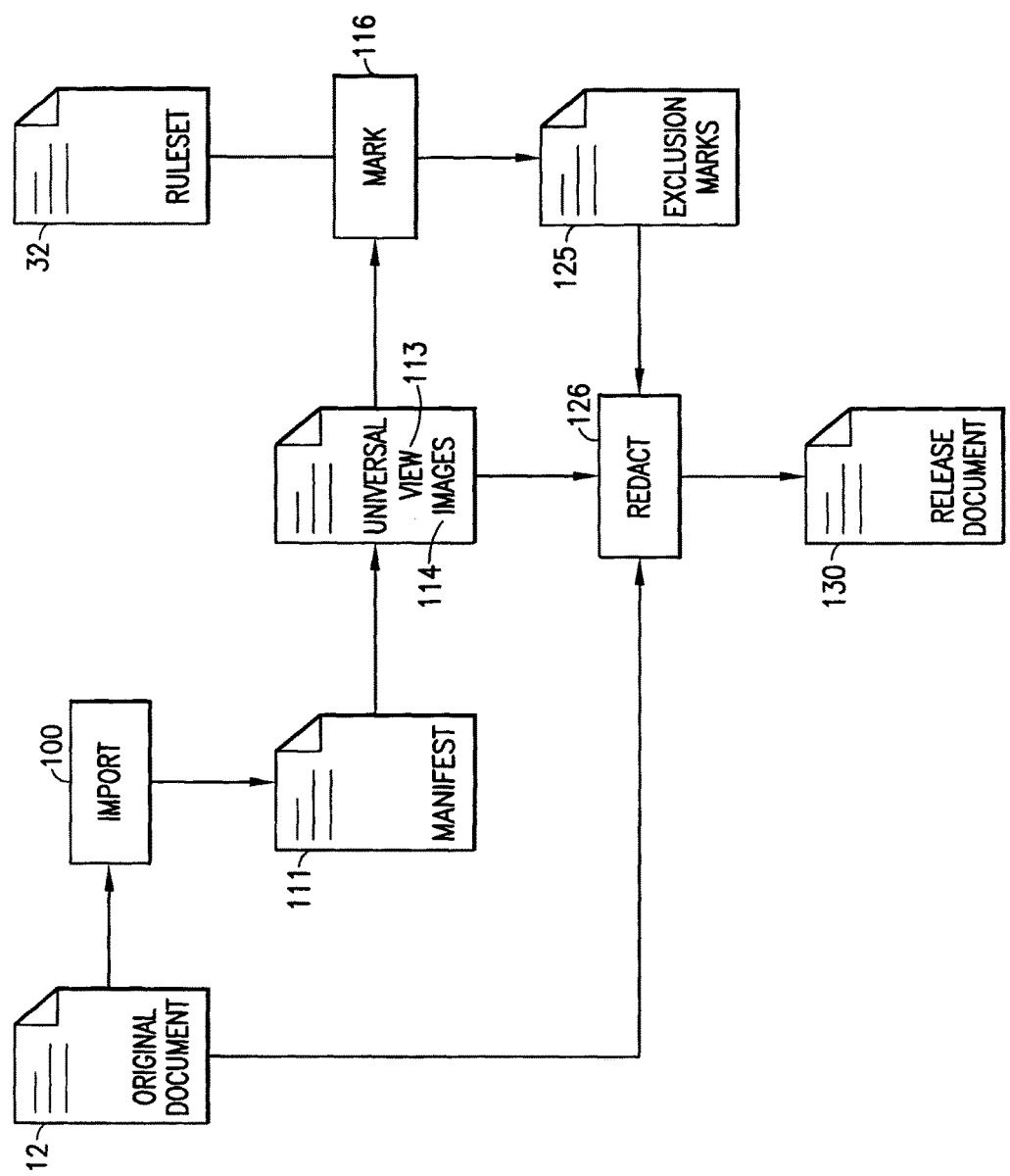
FIG. 34 is a diagram similar illustrating components and steps of one example.

Referring also to FIG. 34, the "immediate redaction" feature of system 101 is shown. The mark step 116 can produce exclusion marks 125 rather than classification marks 118. As soon as the mark step 116 is complete the system can immediately redact 126 the original document 12 to produce a redacted document 130.

Figure 35:
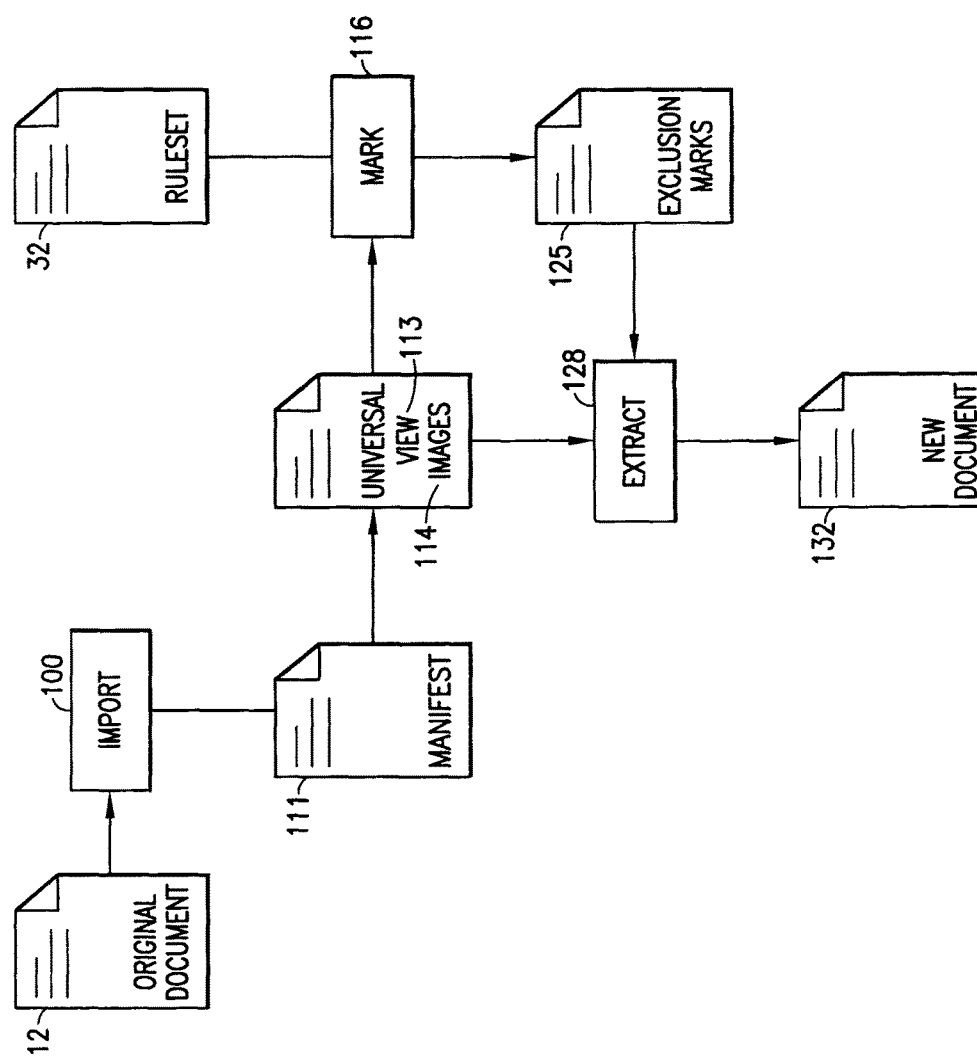
FIG. 35 is a diagram similar illustrating components and steps of one example.

Referring also to FIG. 35, the "immediate extraction" feature of system 101 is shown. The mark step 116 can produce exclusion marks 125 rather than classification marks 118. As soon as the mark step 116 is complete the system can immediately extract 130 content from the universal view 113 with images 114 to produce a new document 132.

Figure 36:
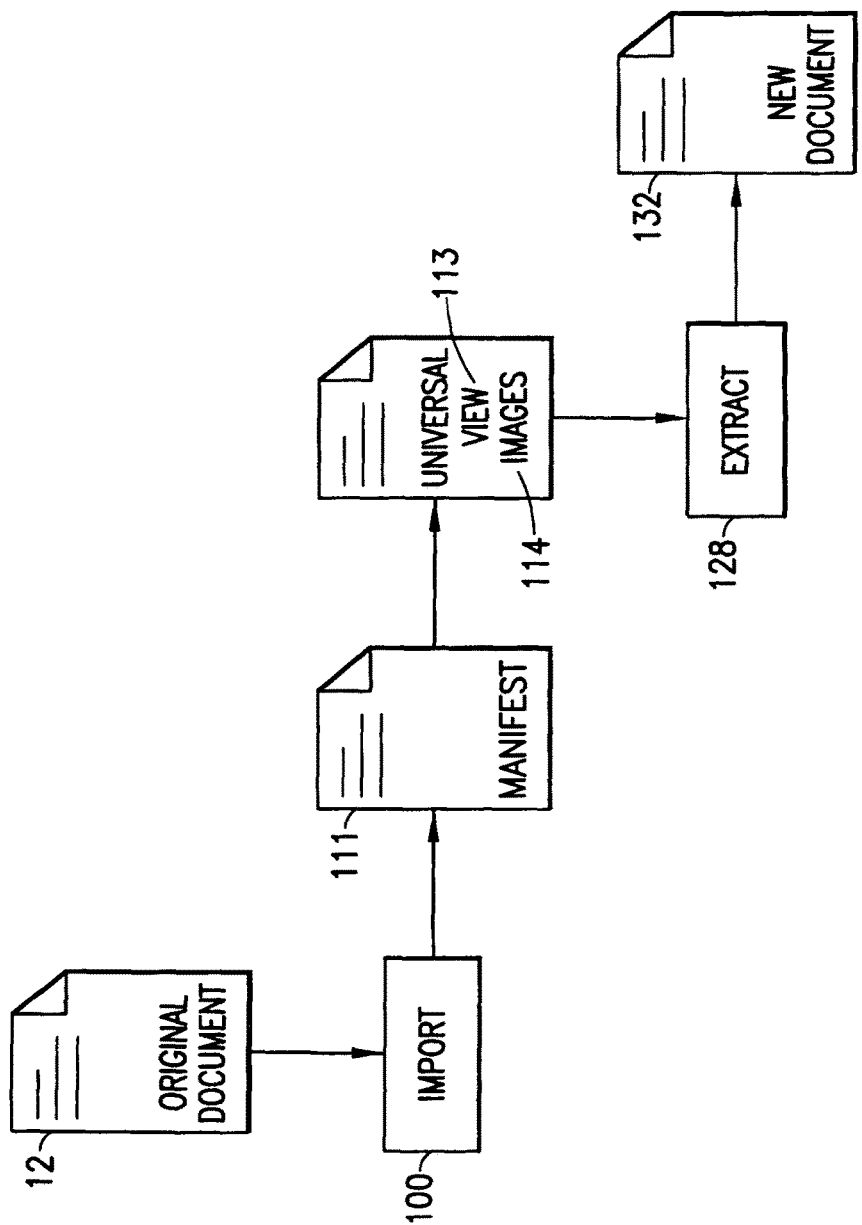
FIG. 36 is a diagram similar illustrating components and steps of one example.

Referring also to FIG. 36, the "safe copy" feature of system 101 is shown which constructs a new document 132 from the universal view 113 with images 114 rather than from the original document (such as when the original document is not stored in the archive in its original form). As soon as the import step 100 is complete the system can immediately extract 130 content from the universal view 113 with images 114 to produce a new document 132. This system allows a clean new document 132 to be immediately produced from the original document 12.

One example method comprises creating a universal view 113 (see FIG. 25 for example) of a document 12 in an archive 110, where the universal view comprises individual portions of information from the document as individual elements (such as 25A and 25B in FIG. 25) of the universal view; applying classifications 118 (such as 26A and 26B in FIG. 26) to at least some of the individual elements; and supplying the individual elements with their respectively applied classifications from the archive (such as to filter 124 in FIG. 23).

Creating the universal view can comprise forming an import logical manifest of the portions of information from the document. Creating the universal view can comprise forming a format independent view having element-by-element backlinks to the logical manifest. Applying classifications can comprise applying classification marks to elements. The individual elements with their respectively applied classifications can be supplied from the archive to a filter. The method may further comprise the filter 124 comparing the classifications 118 applied to the individual elements to at least one releasable classification 123, and creating a redacted document 130 by applying an exclusion 125 to at least one first element of the universal view elements based upon the classification of the at least one first element not matching the at least one releasable classification. The at least one releasable classification may be identified by a universal viewer 120 which is adapted to view all of the elements of the universal view. The at least one releasable classification may be identified by a client portal 122 connected to the archive.

The method may further comprise the filter 124 comparing the classifications applied to the individual elements to at least one releasable classification, and creating a new document 132 with at least one first element of the universal view elements, where the classification of the at least one first element matches the at least one releasable classification, where the classification of at least one second element of the universal view elements does not match the at least one releasable classification, and where the at least one second element is excluded from creating the new document. Creating the new document 132 may further comprise applying an exclusion 125 to at least one of the first elements based upon the classification of the at least one first element not matching at least one of the releasable classifications 123.

A first one of the portions may be in at least two of the elements (such as the A, B and C social security number parts described above), and where each of the at least two elements has a different one of the classifications. Applying the classifications may comprise applying the classifications to all of the individual elements of the universal view. At least some of the classifications 118 may be applied automatically with use of a ruleset 32. At least some of the classifications 118 are applied manually by a user at a universal viewer 120 capable of viewing all of the elements of the universal view.

In one example, a method may be provided comprising comparing by a filter 124 at least one releasable classification 123 to a classification 118 of at least one individual universal view element, where each of the universal view elements comprises an individual portion of an original document; and creating a redacted document 130 by applying an exclusion 125 to at least one first element of the universal view elements based upon the classification of the at least one first element not matching the at least one releasable classification.

The method may further comprise creating the universal view of the original document in an archive; and applying the classifications of the individual elements to all of the individual elements in the universal view. Creating the universal view may comprise forming an import logical manifest of the portions of information from the original document. Creating the universal view may comprise forming a format independent view having element-by-element backlinks to the logical manifest. Applying classifications may comprise applying classification marks to elements.

In one example, a method may be provided comprising comparing at least one releasable classification to a classification of at least one individual universal view element, where each of the universal view elements comprises an individual portion of an original document; and creating a new document 132 with at least one first element of the universal view elements, where the classification of the at least one first element matches the at least one releasable classification, where the classification of at least one second element of the universal view elements does not match the at least one releasable classification, and where the at least one second element is excluded from creating the new document.

In one example, a method may be provided comprising creating a universal view of a document in an archive, where the universal view comprises portions of information from the document as individual elements of the universal view; and applying classifications to at least some of the individual elements, where a first one of the portions is in at least two of the elements, and where each of the at least two elements has a different one of the classifications. Thus overlapping classifications can be provided, such as described above with the A, B and C classifications for a social security number.

In one example, a program storage device (such as a CD-ROM or flash memory for example) readable by a machine, tangibly embodying a program of instructions executable by the machine for performing operations may be provided where the operations comprise creating a universal view of a document in an archive, where the universal view comprises individual portions of information from the document as individual elements of the universal view; applying classifications to at least some of the individual elements; and supplying the individual elements with their respectively applied classifications from the archive.

In one example, a program storage device (such as a CD-ROM or flash memory for example) readable by a machine, tangibly embodying a program of instructions executable by the machine for performing operations may be provided where the operations comprise comparing by a filter at least one releasable classification to a classification of at least one individual universal view element, where each of the universal view elements comprises an individual portion of an original document; and creating a redacted document by applying an exclusion to at least one first element of the universal view elements based upon the classification of the at least one first element not matching the at least one releasable classification.

In one example, a program storage device (such as a CD-ROM or flash memory for example) readable by a machine, tangibly embodying a program of instructions executable by the machine for performing operations may be provided where the operations comprise comparing at least one releasable classification to a classification of at least one individual universal view element, where each of the universal view elements comprises an individual portion of an original document; and creating a new document with at least one first element of the universal view elements, where the classification of the at least one first element matches the at least one releasable classification, where the classification of at least one second element of the universal view elements does not match the at least one releasable classification, and where the at least one second element is excluded from creating the new document.

In one example, a program storage device (such as a CD-ROM or flash memory for example) readable by a machine, tangibly embodying a program of instructions executable by the machine for performing operations may be provided where the operations comprise creating a universal view of a document in an archive, where the universal view comprises portions of information from the document as individual elements of the universal view; and applying classifications to at least some of the individual elements, where a first one of the portions is in at least two of the elements, and where each of the at least two elements has a different one of the classifications.

For the system as shown in FIGS. 23 and 32, the user at the universal viewer 120 can control when the document 130 or 132 is created. This could be done by the user when the user receives a request from a requester (such as a request under the Freedom Of Information Action—FOIA). Based upon who has requested the original document 12, the user can create different results to supply to the requester. For example, the user can select the releasable classifications 123 based upon the classification access level of the requester. If the requester has a Top Secret classification access level, then the user would identify the release classifications for that Top Secret classification access level and the redacted document 130 created by the user would have "Top Secret" elements on the redacted document 130 which are not redacted. If the requester does not have a Top Secret classification access level, then the user would identify the release classifications for that non-Top Secret classification access level and the redacted document 130 created by the user would have "Top Secret" elements redacted on the redacted document 130. For the system as shown in FIGS. 31 and 33, a user at the client portal 122 can control when the document 130 or 132 is created. For creating the documents 130, 132 (after the universal view elements have all been classified, and after user classification access levels have been identified for the universal view element classification) the user at the viewer 120 of FIGS. 23 and 32 and the user at client portal 122 of FIGS. 31 and 33 could be automated to control creation and release of the documents 130, 132.

The foregoing description has provided by way of exemplary and non-limiting examples a full and informative description of the best methods and apparatus presently contemplated by the inventors for performing document redaction. One skilled in the art will appreciate that the various embodiments described herein can be practiced individually; in combination with one or more embodiments described herein; or in combination with redaction systems differing from those described herein. Further, one skilled in the art will appreciate that the invention can be practiced by other than the described embodiments; that the described embodiments are presented for the purposes of illustration and not of limitation; and that the invention embraces all alternatives, modifications and variations.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   creating an import logical manifest of individual portions of information from a document by a digital processing apparatus;
   creating a universal view from the import logical manifest by the digital processing apparatus in an archive, where the creating of the universal view comprises creating images of individual portions of information from the document as individual elements of the universal view stored in at least one memory of the archive, where the creating of the universal view comprises forming element-by-element backlinks to the import logical manifest;
   identifying different ones of the individual elements of the universal view for having different classifications and applying the classifications to at least some of the individual elements by the digital processing apparatus of the archive, where the applying of the classifications comprises applying different ones of the classification marks to at least two different ones of the individual elements based, at least partially, upon an analysis of the individual portions of information; and supplying at least some of the individual elements with their respectively applied classifications from the archive, where the individual elements with their respectively applied classifications are supplied from the archive to a filter, and further comprising the filter comparing the classifications applied to the individual elements to at least one releasable classification, and creating a new document with at least one first element of the universal view elements, where the classification of the at least one first element matches the at least one releasable classification, where the classification of at least one second element of the universal view elements does not match the at least one releasable classification, and where the at least one second element is excluded from creating the new document.

2. A method as claimed in claim 1 where the creating of the universal view comprises forming a format independent view having the element-by-element backlinks to the import logical manifest.

3. A method as claimed in claim 1 where the individual elements with their respectively applied classifications are supplied from the archive to a filter, and further comprising:
the filter comparing the classifications applied to the individual elements to at least one releasable classification, and
creating a redacted document by applying an exclusion to at least one first element of the universal view elements based upon the classification of the at least one first element not matching the at least one releasable classification.

4. A method as claimed in claim 3 where the at least one releasable classification is identified by a universal viewer which is adapted to view all of the elements of the universal view, and where the at least one releasable classification is identified by a client portal connected to the archive.

5. A method as claimed in claim 1 where the creating of the new document further comprises applying an exclusion to at least one of the first elements based upon the classification of the at least one first element not matching at least one of the releasable classification.

6. A method as claimed in claim 1 where a first one of the individual portions is in at least two of the individual elements of the universal view, and where each of the at least two individual elements has a different one of the classifications, and where applying the classifications comprises applying the classifications to all of the individual elements of the universal view.

7. A method as claimed in claim 1 where at least some of the classifications are applied automatically with use of a ruleset.

8. A method as claimed in claim 7 where at least some of the classifications are applied manually by a user at a universal viewer capable of viewing all of the elements of the universal view.

9. A method as in claim 1 where the import logical manifest is created with an address unique ID number for each of the individual portions of information from the document.

10. A method as in claim 1 where the method comprises use of a rule set to determine which of the different classifications to apply to the images of the individual elements of the universal view.

11. A method as claimed in claim 1 further comprising receiving release classifications from an external client portal, and creating a redacted document based upon a comparison of the received release classifications and the classifications marks of the individual elements of the universal view.

12. A method as in claim 1 where the individual elements of the universal view only comprise images, which are created from the document, which are used to form the universal view.

13. A method comprising:
receiving at least one releasable classification from an external client portal;
comparing by a filter the at least one releasable classification to an element classification of at least one individual universal view element, where each of the at least one individual universal view element comprises an image of an individual portion of an original document, where the comparing by the filter comprises use of at least one digital processing apparatus and at least one memory which comprises the at least one individual universal view element;
the at least one digital processing apparatus and a computer program stored in the at least one memory creating a redacted document by applying an exclusion to at least one first element of the at least one individual universal view element based upon the element classification of the at least one first element not matching the at least one releasable classification and storing the redacted document in the at least one memory;
creating a universal view of the original document in an archive, where the archive comprises the at least one memory, where the creating of the universal view comprises forming element-by-element backlinks to an import logical manifest of the individual portions of the original document; and
applying at least one of the element classifications to all of the individual elements in the universal view, where the element classifications comprise at least two different element classifications;
where applying the element classifications comprises applying classification marks to individual elements in the universal view.

14. A method as claimed in claim 13 where the creating of the universal view comprises forming the import logical manifest of the portions of information from the original document.

15. A method as claimed in claim 14 where the creating of the universal view comprises forming a format independent view having the element-by-element backlinks to the logical manifest.

16. A method as in claim 13 where all of the individual universal view elements comprise an image of respective ones of the individual portions of the original document.

17. A method as in claim 16 where the individual universal view elements comprise only the image of the respective ones of the individual portions of the original document.

18. A method comprising:
creating an import logical manifest of individual portions of information from a document by an apparatus comprising at least one processor and at least one memory storing a computer program;
creating a universal view from the import logical manifest by the apparatus, where the creating of the universal view comprises creating images of the individual portions of information from the document as individual elements of the universal view, where the universal view is a format independent view and comprises an element-by-element backlink to the import logical manifest;

comparing, by the apparatus, at least one releasable classification to an element classification of at least one of the individual elements of the universal view, where the element classification of the at least one individual elements of the universal view comprises a classification mark applied to the at least one individual elements of the universal view, where each of the individual elements of the universal view are stored in the at least one memory and each of the individual elements of the universal view comprises the images of individual portions of information from the document; and the apparatus, including use of the at least one processor and the computer program, creating a new document with at least one first element of the individual elements of the universal view, where the element classification of the at least one first element matches the at least one releasable classification, where the element classification of at least one second element of the individual elements of the universal view does not match the at least one releasable classification, and where the at least one second element is excluded from creating the new document, and storing the new document in the at least one memory and/or outputting the new document from the apparatus.

19. A method comprising:

creating an import logical manifest of individual portions of information from a document by a digital processing apparatus;

creating a universal view of by the digital processing apparatus from the import manifest, where the universal view comprises all portions of information from the document being individual elements of the universal view, where the portions of information are only images of the information, where the universal view is a format independent view and comprises an element-by-element backlink to the import logical manifest;

applying element classifications to at least some of the individual elements by the digital processing apparatus and storing the individual elements and classifications in the at least one memory, where the element classifications comprises a classification mark applied to the individual elements, where a first one of the portions is in at least two of the individual elements, and where each of the at least two individual elements has a different one of the element classifications; and comparing, by the digital processing apparatus, at least one releasable classification to the element classification of at least one of the individual elements of the universal view, where each of the individual elements of the universal view comprises the images of the portions of information from the document; and creating a new document with at least one first element of the individual elements of the universal view, where the element classification of the at least one first element matches the at least one releasable classification, where the element classification of at least one second element of the individual elements of the universal view does not match the at least one releasable classification, and where the at least one second element is excluded from the creating of the new document, and storing the new document in the at least one memory and/or outputting the new document from the digital processing apparatus.

* * * * *